(12) United States Patent
Dent

(10) Patent No.: US 8,004,959 B2
(45) Date of Patent: Aug. 23, 2011

(54) DIFFERENT ORTHOGONAL CODE SETS WITH MEMBERS IN COMMON

(75) Inventor: Paul Dent, Pittsboro, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1020 days.

(21) Appl. No.: 11/631,789

(22) PCT Filed: Jul. 6, 2005

(86) PCT No.: PCT/SE2005/001130
§ 371 (c)(1),
(2), (4) Date: Aug. 6, 2007

(87) PCT Pub. No.: WO2006/004551
PCT Pub. Date: Jan. 12, 2006

(65) Prior Publication Data
US 2008/0285534 A1 Nov. 20, 2008

Related U.S. Application Data

(60) Provisional application No. 60/585,097, filed on Jul. 6, 2004.

(51) Int. Cl.
*H04J 11/00* (2006.01)
*H04B 7/216* (2006.01)
*H04B 1/00* (2006.01)
(52) U.S. Cl. .......... 370/209; 370/342; 375/140
(58) Field of Classification Search .......... None
See application file for complete search history.

(56) References Cited

U.S. PATENT DOCUMENTS

| 4,476,566 | A | 10/1984 | Dent |
| 5,151,919 | A | 9/1992 | Dent |
| 5,353,352 | A | 10/1994 | Dent et al. |
| 5,550,809 | A | 8/1996 | Bottomley et al. |
| 5,742,678 | A | 4/1998 | Dent et al. |
| 5,771,288 | A | 6/1998 | Dent et al. |
| 6,122,266 | A * | 9/2000 | Lynch .......... 370/335 |
| 6,215,762 | B1 | 4/2001 | Dent |
| 6,229,796 | B1 * | 5/2001 | Dent .......... 370/335 |
| 6,359,874 | B1 | 3/2002 | Dent |

(Continued)

FOREIGN PATENT DOCUMENTS
WO  WO 99/12284  3/1999
(Continued)

OTHER PUBLICATIONS

International Search Report for PCT/SE2005/001130 mailed Dec. 23, 2005.

(Continued)

*Primary Examiner* — Nittaya Juntima
(74) *Attorney, Agent, or Firm* — Nixon & Vanderhye PC

(57) ABSTRACT

A first orthogonal codeset, obtainable in various manners, is used in a first cell to provide orthogonal spreading codes for traffic signals originating within the first cell. A second orthogonal code set for use in a second cell is obtained that has at least a first code in common with the first orthogonal code set by selecting any code in the first codeset to be the first common code. The plural orthogonal codesets can be utilized in various ways and in various environments. For example, the plural orthogonal codesets can be used for operation of a user equipment unit in a code division multiple access (CDMA) network.

26 Claims, 10 Drawing Sheets

U.S. PATENT DOCUMENTS

| | | | |
|---|---|---|---|
| 6,388,998 B1 * | 5/2002 | Kasturia | 370/320 |
| 6,473,395 B1 * | 10/2002 | Lee | 370/209 |
| 6,590,889 B1 | 7/2003 | Preuss et al. | |
| 7,349,421 B2 * | 3/2008 | Shanbhag | 370/441 |
| 2001/0031010 A1 | 10/2001 | Shanbhag | |
| 2002/0171568 A1 | 11/2002 | Yang | |
| 2002/0172180 A1 | 11/2002 | Hall et al. | |
| 2003/0016733 A1 | 1/2003 | Sha | |
| 2004/0071115 A1 | 4/2004 | Earnshaw et al. | |

FOREIGN PATENT DOCUMENTS

| | | |
|---|---|---|
| WO | WO 01/01584 A2 | 1/2001 |
| WO | 03/081797 | 10/2003 |

OTHER PUBLICATIONS

International Search Report for PCT/SE2005/001129 mailed Dec. 23, 2005.

Cha et al., *ZCD-UWB system using enhanced ZCD codes Ultra Wideband Systems*, 2004, Joint with Conference on Ultrawideband Systems and Technologies, Joint UWBST & IWUWBS, XP010715178.

U.S. Appl. No. 11/631,790, filed Jan. 8, 2007, entitled Non-Contiguous Variable Length Orthogonal Codes.

* cited by examiner

DIFFERENT ORTHOGONAL CODE SETS WITH MEMBERS IN COMMON

This application is the US national phase of international application PCT/SE2005/001130 filed 6 Jul. 2005, which designated the U.S. and claimed priority of U.S. 60/585,097 filed 6 Jul. 2004, the entire contents of each of which are hereby incorporated by reference. This application is related to US national phase of international application PCT/SE2005/001129 filed 6 Jul. 2005, which is also hereby incorporated by reference.

BACKGROUND

1. Technical Field

The invention is useful in Code Division Multiple Access mobile cellular or satellite communications systems employing orthogonal coding on at least one of the forward link (downlink) or return link (uplink), and can be used in particular to avoid the pilot code of one cell interfering with reception in a neighboring cell.

2. Related Art and Other Considerations

Research shows that the capacity of a cellular communications system is maximized when no own-cell interference exists; that is, signals in the same cell do not interfere with one another, and the only interference is from other cells. There are two basic methods for avoiding own-cell interference:

A first method for avoiding own-cell interference transmits signals in the same cell that are not orthogonal to each other, i.e. they have a non-zero correlation one with another, but uses some type of interference cancellating receiver such as a joint demodulator to avoid or reduce the interference effects.

A second method for avoiding own-cell interference attempts to keep signals in the same cell orthogonal to each other either by giving them different frequencies (FDMA), different transmission timeslots (TDMA) or different orthogonal spreading codes (CDMA).

The orthogonality of TDMA and FDMA systems is unaffected by propagation delay differences or multipath, while the orthogonality of CDMA is progressively destroyed as the spread bandwidth increases. TDMA is better suited for a mobile communications system than FDMA or CDMA, as motion-induced channel changes are slower in relation to the underlying information symbol modulation rate.

Therefore unless interference cancellation is used (e.g., the first method), TDMA will exhibit higher capacity than CDMA, other factors that affect the comparison, such as power control, error correction coding etc being alike.

In U.S. Pat. Nos. 6,215,762 and 6,359,874 (incorporated herein by reference), a block-spreading system is disclosed that is better at maintaining orthogonality under multipath conditions, allowing the CDMA systems of the second above-described method to approach the capacity of TDMA systems. U.S. Pat. No. 5,151,919 (incorporated herein by reference) discloses a first above-described method system (interference cancellation) which may achieve even higher capacity at the expense of greater receiver complexity.

The term Code Division Multiple Access (CDMA) refers to a method by which multiple transmitting stations (e.g. mobile phones) can Communicate their independent data streams to a common receiver (e.g. a cellular base station receiver) The communication at multiple data streams from a common transmitter (i.e. a cellular base station) to a plurality of receivers (i.e. different mobile phones) by Code Division is perhaps more properly referred to as Code Division Multiplex. However, for sake of simplicity the two terms Code Division Multiple Access and Code Division Multiplex will herein be regarded as equivalent. Thus "CDMA" will be used as a term of description for both the uplink and the downlink, even though the downlink may be more accurately described as Code Division Multiplex (CDM).

The use of orthogonal Walsh codes in communications systems is well known. The Code Division Multiple Access system known as IS95 uses Walsh codes of length 64 to scramble signals transmitted by a cellular base station to different mobile stations, the orthogonality of the codes reducing interference between signals intended for different mobiles. The IS95 return link uses all 64, length-64 Walsh codes in every mobile station to encode 6-bit data blocks, the different mobile transmissions being rendered unlike by the use of different scrambling sequences. This return link or uplink use of the Walsh codes does not attempt to make different signals orthogonal, but rather is a farm of error correction coding called (64,6) orthogonal block encoding. See, for example, Garg, Vijay K. et al., *Applications of CDMA in Wireless/Personal Communications*, Prentice Hall (1997), which is incorporated herein by reference.

The wideband CDMA cellular system known as UMPTS also uses orthogonal Walsh codes to discriminate between different base-to-mobile links. In this case, the orthogonal codes are not of a fixed length, but depend on the datarate of a particular link. Nevertheless, signals of different code length and datarate remain nominally orthogonal to each other.

In both IS95 and UMPTS, different cells apply different scrambling sequences to transmissions originating in the cell, so that no transmission in one cell is spread identically to a transmission in an adjacent cell. The transmissions in one cell thus appear as noise to the receivers in another cell.

The total interfering power from one cell to an adjacent cell is thus partly due to high power transmissions between the base station and cell-edge stations, and partly due to lower power transmissions between the base station and mobile station This effect known as "interference averaging", is a desirable effect that avoids the need to design for worst cases.

When randomly different scrambling codes are used to make transmissions in neighboring cells different, there is a statistical probability that the correlation between a code in one cell and a code in the other cell will momentarily be high, departing from ideal interference-averaging statistics. To improve the statistics, one or more of U.S. Pat. Nos. 5,353,352; 5,550,809; 5,742,678; and 5,771,288 (all incorporated herein by reference) disclose a method of devising systematically different scrambling codes for use in neighboring cells that provide a guaranteed low correlation between any code used for one transmission and any code used for another transmission.

In CDMA systems, it is common to reserve a particular code in each cell for transmitting a reference or "pilot" signal from the base station that can be used as a phase and channel reference for decoding traffic signals using other codes. As much as 25% of the transmitted power from a base station can be allocated to such a reference signal. When the traffic loading in a cell is low, the reference signal can thus often be the majority of the interference exported to neighboring cells, a phenomenon known as "pilot pollution". It would be desirable if the pilot signal of one cell could either be the same in all cells, as is possible for satellite systems, or be at least nominally orthogonal to the traffic signals in another cell to avoid such interference. By nominally orthogonal is meant that the correlation is zero with zero time difference between the signals of one cell and the signals in another cell. When a pilot code common to all cells is employed, the pilot is desirably orthogonal to all traffic signals in all cells. This is more readily achieved in a satellite system, where multipath propagation is limited, and the distance and channel through which signals propagate from the satellite to any given station is identical for all signals. It is also more feasible to achieve time synchonisation between the sectors of a sectorized cellular system, wherein the service area of a base station is divided into angular sectors served by directional antennas on the same tower.

Thus, particularly in satellite applications of CDMA, there is an interest in having pilot codes in one cell be orthogonal to traffic signals in another cell. This requires other methods than using different scrambling codes to render the traffic codes in one cell different than the traffic codes used in another cell.

For terrestrial applications, other methods to preserve orthogonality in the face of multipath propagation or delay differences are disclosed in the aforementioned U.S. Pat. Nos. 6,215,762 and 6,359,874. Such methods may be improved by using the current invention to construct codesets that have codes in common with the codes used in adjacent cells.

SUMMARY

A first orthogonal codeset is obtained in any manner and used in a first cell to provide orthogonal spreading codes for traffic signals originating within the first cell. A second orthogonal code set for use in a second cell is obtained that has at least a first code in common with the first orthogonal code set by selecting any code in the first codeset to be the first common code. The first common code, combined with each member of the first code set, produces a first modified codeset containing the all one's (1) code in place of the first common code. A second modified codeset has bit-columns that are the same as the bit columns of the first modified codeset except for a permutation that leaves the all one's (1) code unchanged. A second orthogonal codeset is then given by the combination of the first common code with each member of the second modified codeset. Other codesets may be obtained with the first common code in common to each by using different column permutations. The permutations can be selected to minimize the correlation between any member of one set and any member of any other set, except for the code in common.

A second orthogonal codeset may alternatively be obtained with two codes in common to the first orthogonal codeset by selecting any code in the first modified codeset containing equal numbers of ones (1) and zeroes (0) to be the second code in common. A second modified codeset is then obtained having the same bit columns as the first modified codeset except for a first permutation among the columns containing a one (1) in the second common code and a second permutation among columns containing a zero (0) in the second common code, such permutations leaving the first and second common codes unchanged.

The second orthogonal codeset is then given by the combination of the first common code with each member of the second modified codeset. Other codesets may be obtained with the first and second common codes common to each by using different column permutations. The permutations can be selected to minimize the correlation between any member of one set and any member of any other set, except for the codes in common.

The above process can be extended as disclosed herein to produce different orthogonal code sets with more than two codes in common.

For constructing different codesets with one code member in common and a minimum correlation between the other codes, it is disclosed that such codesets can be obtained by forming a bit matrix by writing all cyclic shifts of a maximum-length sequence under one another and then appending an all-zeros row and an all-zeros column to obtain an orthogonal codeset. Different orthogonal codesets are obtained by using different maximum length sequences of the same length, of which there are a finite number. The Walsh-Hadamard codeset may be included in the set of codesets and has the same low cross-correlation properties as the maximum length sequence (MLS)-derived codesets. Other codesets may be found in addition, for example by computer search. Other codeset generation methods are given for codes too long to search though economically, by developing column permutation patterns that may be interatively applied to the starting codeset or codesets to generate a cyclic sequence of different codesets.

A random real or complex scrambling code may be combined with all codes in all sets obtained by the disclosed methods while preserving mutual orthogonality within each set and the same, low, zero-lag cross-correlation between nets.

The plural orthogonal codesets can be utilized in various ways and in various environments. For example, the plural orthogonal codesets can be used for operation of a user equipment unit in a code division multiple access (CDMA) network. In this regard, the user equipment, in addition to having a transceiver for performing radio communications with a radio access network, comprises a memory for storing plural orthogonal codesets and a code selector for selecting a code from one of the plural codesets for use in performing the radio communications with the radio access network (wherein the plural orthogonal codesets have at least a first code in common with one another).

In one example user equipment unit embodiment, the code selector can select the code for use in performing the radio communications in accordance with a code selection indicator included in a channel assignment message received from the radio access network. In another example user equipment unit embodiment, the code selector can select the code for use in performing the radio communications based on an identity of a cell in which the user equipment unit operates.

The plural orthogonal codesets can also be utilized for operation of a CDMA communications network which has a service area comprising cells that re-use same spectral resources. The CDMA network comprises at least one network node for selecting, from the plural orthogonal codesets, a codeset for use in each cell, a codeset in one cell being different than a codeset in an adjacent cell apart from having at least one code in common.

In an example embodiment such CDMA network can be a terrestrial cellular network wherein a user equipment unit performs code division multiple access (CDMA) radio communications with a radio access network. In such network, a radio access network node comprises a memory for storing plural orthogonal codesets (the plural orthogonal codesets having at least a first code in common with one another) and a code selector for selecting a specified code from the plural codesets for use by the user equipment unit in performing the radio communications between the user equipment unit and radio access network. The network further comprises means for transmitting the specified code or an indication of the specified code to the user equipment unit. For example, the transmitting means can include at least one radio base station node for transmitting into a corresponding cell.

In an example embodiment such CDMA network can be a satellite communications network comprising a network node. In such case, the network node comprises a memory for storing plural orthogonal codesets, the plural orthogonal codesets having at least a first code in common with one another. A satellite antenna system transmits plural radio beams into respective plural cells in accordance with the codeset reuse pattern, the codesets employed in the reuse pattern belonging to the plural orthogonal codesets. In example implementations, the first code in common can be used as for a common pilot code for the plural radio beam. As another optional feature, radiation in the plural beams can be phased so that constructive addition occurs at beam edges to produce a substantially uniform pilot signal illumination for the plural cells.

In another example CDMA network terrestrial embodiment, the network include a radio access network node. The radio access network node comprises an antenna system for transmitting into differing cell sectors using codes selected from the plural orthogonal codesets. The codes utilized within a sector are orthogonal and, as a separate feature, two codes used in adjacent sectors are selected can be based on a correlation value. In an example implementation, the first code in common can be used in plural sectors as a pilot code or for a calling channel.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2A is a schematic view of an example user equipment unit receiving a cell identifier and selecting an appropriate code in accordance therewith FIG. 2B is a schematic view of an example user equipment unit receiving a code assignment and retrieving the corresponding code.

DETAILED DESCRIPTION

Figure 1:
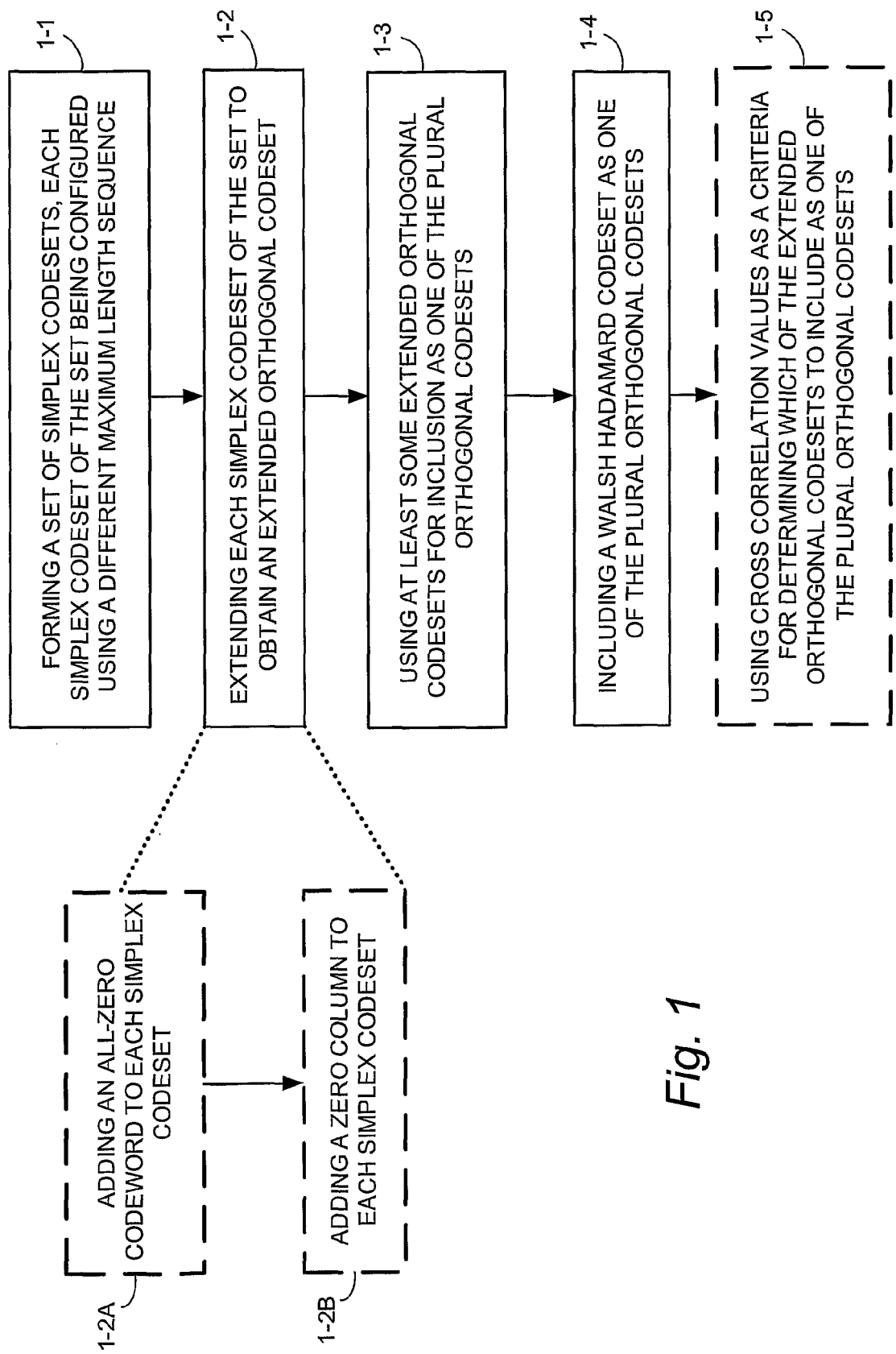
FIG. 1 is a flowchart showing example basic steps involved in a method of preparing plural orthogonal codesets.

In the following description, for purposes of explanation and not limitation, specific details are set forth such as particular architectures, interfaces, techniques, nodes, functional entities, protocols, standards, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor(s) or general purpose computer(s), either distributed or concentrated, and using an application specific integrated circuit (ASIC), and/or using one or more digital signal processors (DSPs)

The Walsh-Hadamard orthogonal codeset is normally used as the basic set of orthogonal codes. The Walsh-Hadamard codeset can be scrambled by multiplying every code in it by a random real or complex scrambling sequence without destroying the mutual orthogonality of the codes. The complete set of Walsh codes of length 16 is shown as the codes in Table 1 (or their complements).

TABLE 1

| Walsh Codes of Length 16 |
|---|
| 1111111111111111 |
| 1111111100000000 |
| 1111000011110000 |
| 1111000000001111 |
| 1100110011001100 |
| 1100110000110011 |
| 1100001111000011 |
| 1100001100111100 |
| 1010101010101010 |
| 1010101010010101 |
| 1010010110100101 |
| 1010010101011010 |
| 1001100110011001 |
| 1001011010010110 |
| 1001011001101001 |

A Walsh-Hadamard codeset can be constructed by starting with all bit patterns that look like square-waves an octave apart in frequency, e.g., in the manner shown in Table 2, and then forming all possible combinations of the form of Expression 1.

$$a1.w1+a2.w2+a3.w4+a4.w8 \quad \text{Expression 1}$$

In Expression 1, "." signifies AND; "+" means bitwise modulo-2 addition (XOR); and (a4 a3 a2 a1) is the four-bit index of the codeword to be generated. This procedure generates the complement of the codeset shown above when (a4 a3 a2 a1) is incremented from zero to 15.

TABLE 2

| | |
|---|---|
| w1 = 0000000011111111 | frequency = bitrate/16 |
| w2 = 0000111100001111 | frequency = bitrate/8 |
| w4 = 0011001100110011 | frequency = bitrate/4 |
| w8 = 0101010101010101 | frequency = bitrate/2 |

The four codewords w1, w2, w4, w8 that are used to generate the set are known as the basis vectors, and they must be linearly independent in order to generate all 16 codewords. Other sets of four linearly independent basis vectors could be chosen, so long as they contain equal numbers of ones (1) and zeroes (0) and have a zero in the leftmost position. The latter requirement is because the polarity of the codes in the codeset, i.e. whether a code or its complement is used, is reserved for modulating the information symbols.

Every code differs from every other code in exactly half its bit positions, so that the correlation between any one code and any other is exactly zero.

It will also be noted that, with the above ordering, which corresponds to the index (a4 a3 a2 a1) incrementing regularly from 0 to 15, the matrix is symmetrical, having columns that are identical to corresponding-numbered rows. The columns also therefore form a set of orthogonal codewords, and contain the four basis vectors in columns 1, 2, 4, and 8 with the convention that the first or leftmost column is numbered zero.

The number of like and unlike bits between any two codewords remains unchanged if the columns of the above bit matrix are permuted. For example, by permuting columns (and reordering the codes as necessary) one can obtain the code set of Table 2.

TABLE 3

```
111111111111111
1000011101100101
1100001110110010
1010000111011001
1101000011101100
1010100001110110
1001010000111011
1100101000011101
1110010100001110
1011001010000111
1101100101000011
1110110010100001
1111011001010000
1011101100101000
1001110110010100
1000111011001010
```

The code set of Table 3 may also be produced by rotating the length-15 maximum length sequence 000011101100101 and appending a first row and first column of 1's. The usual notation for a maximum length sequence is the complement of this, in which case a column of zeros should be added, obtaining a complementary code set. Either the code set or its complement may be used with equal effect, the ability to change the sign or the phase being reserved to encode the data.

It is already known in the art that the set of cyclic rotations of a maximum length sequence, together with the all zeros code, form a useful codeset known as the simplex codeset. Codes in the simplex codeset have one more unlike bit than they have like bits, giving a cross-correlation of −1/N. By appending a column of like bits, the number of like and unlike bits between any two codewords is then the same, so that the extended codes have cross-correlation zero, i.e. they form an orthogonal set. It was also already known in the art that extending the simplex code set in this way produced an orthogonal codeset.

The Walsh code set and the extended simplex code set contain a common member, the all ones (1) code. In fact, any permutation of the columns of a codeset containing an all 1's or all 0's code leaves that code unchanged, while changing the others. Thus permuting the columns can be a method to produce codesets that are different except for containing a common member.

If an initial codeset does not have an all 1's or all 0's code, it can be modified to contain an all zeros code by selecting any code and modulo-2 adding the selected code to all codes in the set. The selected code becomes mod-2 added to itself, creating an all zeros code. After permuting columns, the selected code can be mod-2 added back again, thus obtaining a new code set that contains the selected code in common with the original set.

For example, suppose the initial codeset is that of Table 4. Selecting the second code 10001100 to modulo-2 add to all the codes yields the codes of Table 5. Then, interchanging columns 2 and 8, 6 and 7, and 3 and 4 yields Table 6. The resulting code set (Table 6) is now different apart from the common all-zeros code. Adding back the original code 2, i.e., 10001100, results in the codeset of Table 7, which is a codeset that differs from the initial codeset apart from having the second code in common.

TABLE 4

```
11101111
10001100
11011010
10111001
11100000
10000011
11010101
10110110
```

TABLE 5

```
01100011
00000000
01010110
00110101
01101100
00001111
01011001
00111010
```

TABLE 6

```
01010101
00000000
00100111
01110010
00011011
01001110
01101001
00111100
```

TABLE 7

```
11011001
10001100
10101011
11111110
10010111
11000010
11100101
10110000
```

A processor or controller executing a suitable computer program can randomly interchange columns until the correlation between all codes in the initial set (apart from the common code) and all codes in the column-permuted set is minimized. Moreover, such a computer program can be arranged to search for several, differently-permuted sets having the lowest cross correlation. In general, it is found that a first number of sets having the very lowest cross correlation can be found, and that this first number is at least one more than the number of different maximum length sequences of length $2^N-1$ that exist, where $2^N$ is the length of the orthogonal codes. The codesets in question may in fact be formed by extending the maximum length sequence (MLS)-derived simplex codesets, with the Walsh-Hadamard (WH) set forming one more set with the same, low, mutual cross-correlation.

However, larger numbers of different codesets can be found by starting with the codesets derived as above, and then using a computer to search for others. More codesets will be then be found. Even more can be found if greater cross-correlation is permitted, and sometimes even lower mutual cross-correlation can be found for a reduced number of codesets, less than the number of Maximum Length Sequences.

A systematic method to construct different orthogonal codesets having a common member is illustrated by basic example steps shown in FIG. 1. Step 1-1 involves forming a set of simplex codesets, each constructed using a different maximum length sequence. Step 1-2 includes extending each simplex codeset to obtain an orthogonal codeset, with the aim (reflected by step 1-3) of using at least some of the orthogonal codesets extended by step 1-2 as one of the plural orthogonal codesets. As step 1-4, the Walsh Hadamard codeset is then used to obtain one more codeset.

An example implementation for carrying out step 1-2 is shown by substep 1-2A and substep 1-2B in FIG. 1. Since these substeps are optional, example implementations, they are shown in broken lines in FIG. 1. To illustrate by way of example, there are two ML sequences of length 15, which are just time-reversals of each other: 111100010011010 and 111101011001000. Writing down all cyclic shifts of the first 15 times, then all cyclic shifts of the second 15 times, yields the two codesets of Table 8 and Table 9

TABLE 8

111100010011010
011110001001101
101111000100110
010111100010011
101011110001001
110101111000100
011010111100010
001101011110001
100110101111000
010011010111100
001001101011110
000100110101111
100010011010111
110001001101011
111000100110101

TABLE 9

111101011001000
011110101100100
001111010110010
000111101011001
100011110101100
010001111010110
001000111101011
100100011110101
110010001111010
011001000111101
101100100011110
010110010001111
010110010001111
101011001000111
110101100100011
111010110010001

In accordance with substep 1-2A, the codesets of Table 8 and Table 9 can then be augmented to 16 codes by adding an all zeros codeword to form two simplex codesets. In addition, for carrying out substep 1-2B a zero column is added at the beginning extends the simplex codes to obtain the two respective orthogonal code sets of Table 10 and Table 11.

The Walsh-Hadamard codeset is also maximally unlike the (Table 10 and Table 11) two MLS-derived codesets, so that a set of at least three codesets of length 16 exists that have a code in common, but which otherwise are maximally different.

TABLE 10

0000000000000000
0111100010011010
0011110001001101
0101111000100110
0010111100010011
0101011110001001
0110101111000100
0011010111100010
0001101011110001
0100110101111000
0010011010111100
0001001101011110
0000100110101111
0100010011010111
0110001001101011
0111000100110101

TABLE 11

0000000000000000
0111101011001000
0011110101100100
0001111010110010
0000111101011001
0100011110101100
0010001111010110
0001000111101011
0100100011110101
0110010001111010
0011001000111101
0101100100011110
0010110010001111
0101011001000111
0110101100100011
0111010110010001

Step 1-5 of FIG. 1 reflects a further and optional step which may be performed. Step 1-5 involves using cross correlation values as a criteria for determining which of the extended orthogonal codesets to include as one of the plural orthogonal codesets to be utilized. In context of the preceding example, a computer search carried out by randomly permuting rows discovered another four codesets of length sixteen having the same mutual cross-correlation properties, making seven codesets in total. These seven codesets are listed in Table 12.

TABLE 12

ORTHOGONAL CODESETS OF LENGTH 16 WITH CROSS-CORRELATION less than or equal to 8/16

| | | |
|---|---|---|
| 0000000000000000 | 0000000000000000 | 0000000000000000 |
| 0111100010011010 | 0111101011001000 | 0101010101010101 |
| 0011110001001101 | 0011110101100100 | 0011001100110011 |
| 0101111000100110 | 0001111010110010 | 0110011001100110 |
| 0010111100010011 | 0000111101011001 | 0000111100001111 |
| 0101011110001001 | 0100011110101100 | 0101101001011010 |
| 0110101111000100 | 0010001111010110 | 0011110000111100 |
| 0011010111100010 | 0001000111101011 | 0110100101101001 |
| 0001101011110001 | 0100100011110101 | 0000000011111111 |
| 0100110101111000 | 0110010001111010 | 0101010110101010 |
| 0010011010111100 | 0011001000111101 | 0011001111001100 |
| 0001001101011110 | 0101100100011110 | 0110011010011001 |
| 0000100110101111 | 0010110010001111 | 0000111111110000 |
| 0100010011010111 | 0101011001000111 | 0101101010100101 |
| 0110001001101011 | 0110101100100011 | 0011110011000011 |
| 0111000100110101 | 0111010110010001 | 0110100110010110 |

TABLE 12-continued

ORTHOGONAL CODESETS OF LENGTH 16 WITH CROSS-CORRELATION less than or equal to 8/16

| | | |
|---|---|---|
| 0000000000000000 | 0000000000000000 | 0000000000000000 |
| 0011011101101000 | 0101110000001111 | 0110011100110010 |
| 0110101001110001 | 0001010101111100 | 0011111110000100 |
| 0101110100011001 | 0100100101110011 | 0101100010110110 |
| 0000111111000101 | 0011000011010111 | 0111001001010101 |
| 0011100010101101 | 0110110011011000 | 0001010101100111 |
| 0110010110110100 | 0010010110101011 | 0100110111010001 |
| 0101001011011100 | 0111100110100100 | 0010101011100011 |
| 0010111010011010 | 0101001011101001 | 0010100101111100 |
| 0001100111110010 | 0000111011100110 | 0100111001001110 |
| 0100010011101011 | 0100011110010101 | 0001011011111000 |
| 0111001110000011 | 0001101110011010 | 0110000111001010 |
| 0010000101011111 | 0110001000111110 | 0101101100101001 |
| 0001011000110111 | 0011111000110001 | 0011110000101011 |
| 0100101100101110 | 0111011101000010 | 0110010010101101 |
| 0111110001000110 | 0010101101001101 | 0000001110011111 |
| 0000000000000000 | | |
| 0010110101101010 | | |
| 0000001101110111 | | |
| 0010111000011101 | | |
| 0110001110111000 | | |
| 0100110110100101 | | |
| 0110000011001111 | | |
| 0100110110100101 | | |
| 0111100100010011 | | |
| 0101010001111001 | | |
| 0111101001100100 | | |
| 0101011100001110 | | |

TABLE 12-continued

ORTHOGONAL CODESETS OF LENGTH 16 WITH CROSS-CORRELATION less than or equal to 8/16

0001101010101011
0011011111000001
0001100111011100
0011010010110110

A common scrambling sequence can be combined with all codesets so that the common code 0000000000000000 is transformed into any desired common code. The use of a common scrambling sequence is desirable to obtain lower cross- or auto-correlation at non-zero lag than the unscrambled codes provide. The cross-correlation at non-zero lag is the correlation between one code and another code shifted or rotated, which is obviously very high for the MLS codeset construction.

Apart from the common code, the maximum correlation between any code of one of the sets of Table 12 and any code of the other set is 0.5, or −6 dB. The correlation is equal to the number of bits that agree minus the number of bits that disagree divided by the codelength. The cross correlation matrix values (not divided by the codelength) for the two MLS-derived codes are shown below in Table 13 and Table 14, respectively. The cross-correlation matrices for the other codesets in Table 12 are similar, i.e. not exceeding a value of 8 between codes from different sets.

TABLE 13

CROSS-CORRELATION BETWEEN CODE (i) AND CODE(j) OF THE SAME CODESET

| 16 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 16 | 0 | 0 | 0 | 0 | 0 | 0 | 0 | 0 | 0 | 0 | 0 | 0 | 0 | 0 |
| 0 | 0 | 16 | 0 | 0 | 0 | 0 | 0 | 0 | 0 | 0 | 0 | 0 | 0 | 0 | 0 |
| 0 | 0 | 0 | 16 | 0 | 0 | 0 | 0 | 0 | 0 | 0 | 0 | 0 | 0 | 0 | 0 |
| 0 | 0 | 0 | 0 | 16 | 0 | 0 | 0 | 0 | 0 | 0 | 0 | 0 | 0 | 0 | 0 |
| 0 | 0 | 0 | 0 | 0 | 16 | 0 | 0 | 0 | 0 | 0 | 0 | 0 | 0 | 0 | 0 |
| 0 | 0 | 0 | 0 | 0 | 0 | 16 | 0 | 0 | 0 | 0 | 0 | 0 | 0 | 0 | 0 |
| 0 | 0 | 0 | 0 | 0 | 0 | 0 | 16 | 0 | 0 | 0 | 0 | 0 | 0 | 0 | 0 |
| 0 | 0 | 0 | 0 | 0 | 0 | 0 | 0 | 16 | 0 | 0 | 0 | 0 | 0 | 0 | 0 |
| 0 | 0 | 0 | 0 | 0 | 0 | 0 | 0 | 0 | 16 | 0 | 0 | 0 | 0 | 0 | 0 |
| 0 | 0 | 0 | 0 | 0 | 0 | 0 | 0 | 0 | 0 | 16 | 0 | 0 | 0 | 0 | 0 |
| 0 | 0 | 0 | 0 | 0 | 0 | 0 | 0 | 0 | 0 | 0 | 16 | 0 | 0 | 0 | 0 |
| 0 | 0 | 0 | 0 | 0 | 0 | 0 | 0 | 0 | 0 | 0 | 0 | 16 | 0 | 0 | 0 |
| 0 | 0 | 0 | 0 | 0 | 0 | 0 | 0 | 0 | 0 | 0 | 0 | 0 | 16 | 0 | 0 |
| 0 | 0 | 0 | 0 | 0 | 0 | 0 | 0 | 0 | 0 | 0 | 0 | 0 | 0 | 16 | 0 |
| 0 | 0 | 0 | 0 | 0 | 0 | 0 | 0 | 0 | 0 | 0 | 0 | 0 | 0 | 0 | 16 |

The diagonality of the above matrix (Table 13) demonstrates that each codeset is an orthogonal codeset.

TABLE 14

CROSS-CORRELATION BETWEEN CODE(i) OF CODESET(1) AND CODE(j) OF CODESET(2)

| 16 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 8 | −4 | 4 | −4 | −4 | 0 | 0 | 0 | 4 | 0 | 8 | 4 | −4 | 0 | 4 |
| 0 | 4 | 8 | −4 | 4 | −4 | −4 | 0 | 0 | 0 | 4 | 0 | 8 | 4 | −4 | 0 |
| 0 | 0 | 4 | 8 | −4 | 4 | −4 | −4 | 0 | 0 | 0 | 4 | 0 | 8 | 4 | −4 |
| 0 | −4 | 0 | 4 | 8 | −4 | 4 | −4 | −4 | 0 | 0 | 0 | 4 | 0 | 8 | 4 |
| 0 | 4 | −4 | 0 | 4 | 8 | −4 | 4 | −4 | −4 | 0 | 0 | 0 | 4 | 0 | 8 |
| 0 | 8 | 4 | −4 | 0 | 4 | 8 | −4 | 4 | −4 | −4 | 0 | 0 | 0 | 4 | 0 |
| 0 | 0 | 8 | 4 | −4 | 0 | 4 | 8 | −4 | 4 | −4 | −4 | 0 | 0 | 0 | 4 |
| 0 | 4 | 0 | 8 | 4 | −4 | 0 | 4 | 8 | −4 | 4 | −4 | −4 | 0 | 0 | 0 |
| 0 | 0 | 4 | 0 | 8 | 4 | −4 | 0 | 4 | 8 | −4 | 4 | −4 | −4 | 0 | 0 |
| 0 | 0 | 0 | 4 | 0 | 8 | 4 | −4 | 0 | 4 | 8 | −4 | 4 | −4 | −4 | 0 |
| 0 | 0 | 0 | 0 | 4 | 0 | 8 | 4 | −4 | 0 | 4 | 8 | −4 | 4 | −4 | −4 |
| 0 | −4 | 0 | 0 | 0 | 4 | 0 | 8 | 4 | −4 | 0 | 4 | 8 | −4 | 4 | −4 |
| 0 | −4 | −4 | 0 | 0 | 0 | 4 | 0 | 8 | 4 | −4 | 0 | 4 | 8 | −4 | 4 |

TABLE 14-continued

CROSS-CORRELATION BETWEEN CODE(i) OF
CODESET(1) AND CODE(j) OF CODESET(2)

| 0 | 4  | -4 | -4 | 0  | 0 | 0 | 4 | 0 | 8 | 4 | -4 | 0  | 4 | 8 | -4 |
| 0 | -4 | 4  | -4 | -4 | 0 | 0 | 0 | 4 | 0 | 8 | 4  | -4 | 0 | 4 | 8  |

It will be noted that the sum of the squares of any row or column is constant, equal to 256, or unity if the values had been first divided by the codelength. This is a consequence of Parseval's theorem which states that the power or energy in a vector of values is preserved when it is subjected to an orthogonal transform. Thus the consequence of correlations greater than the "flat" value of four (4) is that there must be zero values, illustrating that many codes in one set are orthogonal to a given code in another set. This can be exploited to reduce the effect of strong interferers in a cellular system.

The top left hand term of the above matrix corresponds to the common code, which is the same in both codesets and is therefore 100% correlated. The matrix also shows that each code other than the common code of one set is orthogonal to the common code and five other codes of the other set. This lends itself to a way of allocating the codes within two cellular cells to minimize inter-cell interference may be devised, by choosing the strongest interferers of one cell to be orthogonal to the receivers they affect most in an adjacent cell. This may be implemented by code-reuse partitioning, which is described in U.S. Pat. No. 6,229,796 (incorporated by reference herein). Alternatively, a code-hopping system may be used, in which each signal in a cell selects codes pseudorandomly from the available codeset codes from information symbol to information symbol in a manner such that signals in the same cell never select the same code at the same time. This form of selection is called "orthogonal hopping" and is described in relation to frequency hopping in U.S. Pat. No. 4,476,566 (incorporated by reference herein).

In another cell, a different code hopping sequence can be used, such that the interference between a particular signal in one cell and a particular signal in another cell is determined by their code cross-correlations varying randomly from symbol to symbol between the values 0, 4, and 8, assuming the above length-16 codes are in use.

For longer codes, more maximum length sequences exist. There are six maximum length sequences of length 31 given in Table 15, which together with the Walsh-Hadamard (WH) codeset generate 7 codesets with maximum cross correlation 12/32. No further codeset was found with cross correlation 12 or less by a computer search.

TABLE 15

Maximum Length Sequences of length 31

1111100011011101010000100101100
1111100110100100001010111011000
1111100100110000101101010001110
1111101110001010110100001100100
1111101000100101011000011100110
1111101100111000011010100100010

There are also six (6) maximum length sequences of length 63, which together with the Walsh-Hadamard codeset give 7 codesets of length 64 with maximum cross correlation 24/64. No further codesets of length 64 with this minimum level of cross-correlation were found by a random computer search. For length 128, the number of ML sequences rises to 18, giving at least 19 codesets with a maximum cross-correlation of 40/128. For length 256, 16 ML sequences are found, but must be arranged in two separate groups of 8 to yield the minimum correlation of 64/256 within each group. The maximum level of cross correlation between the two groups is 96/256. Thus the use of MLS sequences as a systematic method to generate different orthogonal codesets should be subjected to post-verification for individual cases.

The highest cross correlation between any code of one and any code of another of the 17 length-256 codesets comprising the extended simplex sets and the Walsh-Hadamard codeset is given in Table 16 below:

TABLE 16

CROSS CORRELATION BETWEEN LENGTH-256 CODESETS AND THE Walsh-Hadamard CODESET

| MLS | 1 | 2 | 3 | 4 | 5 | 6 | 7 | 8 | 9 | 10 | 11 | 12 | 13 | 14 | 15 | 16 | WH #. |
|---|---|---|---|---|---|---|---|---|---|---|---|---|---|---|---|---|---|
| 1  | 256 | 64  | 32  | 64  | 64  | 64  | 48  | 64  | 32  | 64  | 64  | 48  | 96  | 64  | 64  | 32  | 56 |
| 2  | 64  | 256 | 64  | 64  | 32  | 64  | 96  | 64  | 48  | 64  | 32  | 32  | 48  | 64  | 64  | 64  | 56 |
| 3  | 32  | 64  | 256 | 54  | 64  | 64  | 32  | 32  | 64  | 64  | 96  | 64  | 64  | 48  | 64  | 48  | 56 |
| 4  | 64  | 64  | 64  | 256 | 64  | 64  | 32  | 32  | 48  | 64  | 64  | 96  | 48  | 64  | 32  | 64  | 52 |
| 5  | 64  | 32  | 64  | 64  | 256 | 64  | 64  | 48  | 32  | 64  | 48  | 64  | 64  | 96  | 64  | 32  | 64 |
| 6  | 64  | 64  | 64  | 64  | 64  | 256 | 64  | 96  | 64  | 32  | 32  | 326 | 4   | 43  | 64  | 48  | 72 |
| 7  | 48  | 96  | 32  | 32  | 64  | 64  | 256 | 64  | 64  | 48  | 64  | 64  | 64  | 32  | 64  | 64  | 52 |
| 8  | 64  | 64  | 32  | 32  | 48  | 96  | 64  | 256 | 32  | 64  | 64  | 64  | 64  | 64  | 48  | 64  | 56 |
| 9  | 32  | 48  | 64  | 48  | 32  | 64  | 64  | 32  | 256 | 96  | 64  | 64  | 64  | 64  | 64  | 64  | 56 |
| 10 | 64  | 64  | 64  | 64  | 64  | 32  | 48  | 64  | 96  | 256 | 64  | 48  | 32  | 32  | 64  | 64  | 64 |
| 11 | 64  | 32  | 96  | 64  | 48  | 32  | 64  | 64  | 64  | 64  | 256 | 64  | 32  | 64  | 48  | 64  | 72 |
| 12 | 48  | 32  | 64  | 96  | 64  | 32  | 64  | 64  | 64  | 48  | 64  | 256 | 64  | 64  | 64  | 32  | 56 |
| 13 | 96  | 48  | 64  | 48  | 64  | 64  | 64  | 64  | 64  | 32  | 32  | 64  | 256 | 64  | 32  | 64  | 64 |
| 14 | 64  | 64  | 48  | 64  | 96  | 48  | 32  | 64  | 32  | 64  | 64  | 64  | 64  | 256 | 32  | 64  | 56 |
| 15 | 64  | 64  | 64  | 32  | 64  | 64  | 64  | 48  | 64  | 64  | 48  | 64  | 32  | 32  | 256 | 96  | 56 |
| 16 | 32  | 64  | 48  | 64  | 32  | 48  | 64  | 64  | 64  | 64  | 64  | 32  | 64  | 64  | 96  | 256 | 64 |
| WH | 56  | 56  | 56  | 52  | 64  | 72  | 52  | 56  | 56  | 64  | 72  | 56  | 64  | 56  | 56  | 64  | 256 |

In general the worst case cross correlation between any extended simplex codeset of length $M=2^{2N}$ and any code of another set constructed from a different ML sequence, or the Walsh-Hadamard set, is given by $N/2^N$.

If a higher correlation than this is accepted, more codesets can be found. For example, in the codelength=64 case, if the maximum cross-correlation is relaxed from 24/64 to 28/64, 12 codesets of length 64 can be found. It will be found that permuting the columns of the codeset always changes the greatest cross-correlation value in steps of 4/M, so that the achieved cross-correlations will always be a multiple of 4 divided by M.

Thus a systematic way of generating a first number of codesets having minimum cross correlation values has been described, this first number of codesets sometimes being augmentable, e.g., by a computer search. These codeset construction processes may be carried out off-line, for example in the design phase, and the resulting codesets, which are not excessively numerous, stored in memory in a product such as a cellphone.

In the prior art, only one basic codeset was stored in the cellphone, i.e., the Walsh codeset. In the prior art the Walsh codeset was modified by combining the selected Walsh code with a different scrambling sequence for each base-mobile transmission.

By contrast, a cellphone using the current invention could use a code selected from one of a plurality of codesets selected according to the cell from which it was to receive service. For example, the mobile phone could store or generate a number of basic codesets, and select a codeset according to an indication from the cell it was in. It could also select a code from the set according to a code assignment message from the cell it was in. Alternatively, it could just receive the entire bit pattern of the code to use in a code assignment message, the code and codeset selection having been performed by the network. The determined code may also be combined with a scrambling code, but the scrambling code may now advantageously be the same in adjacent cells or sectors so that the correlation between codes used in different cells or sectors was not purely random, but governed by the designed cross-correlation properties of the different codesets.

Figure 2:
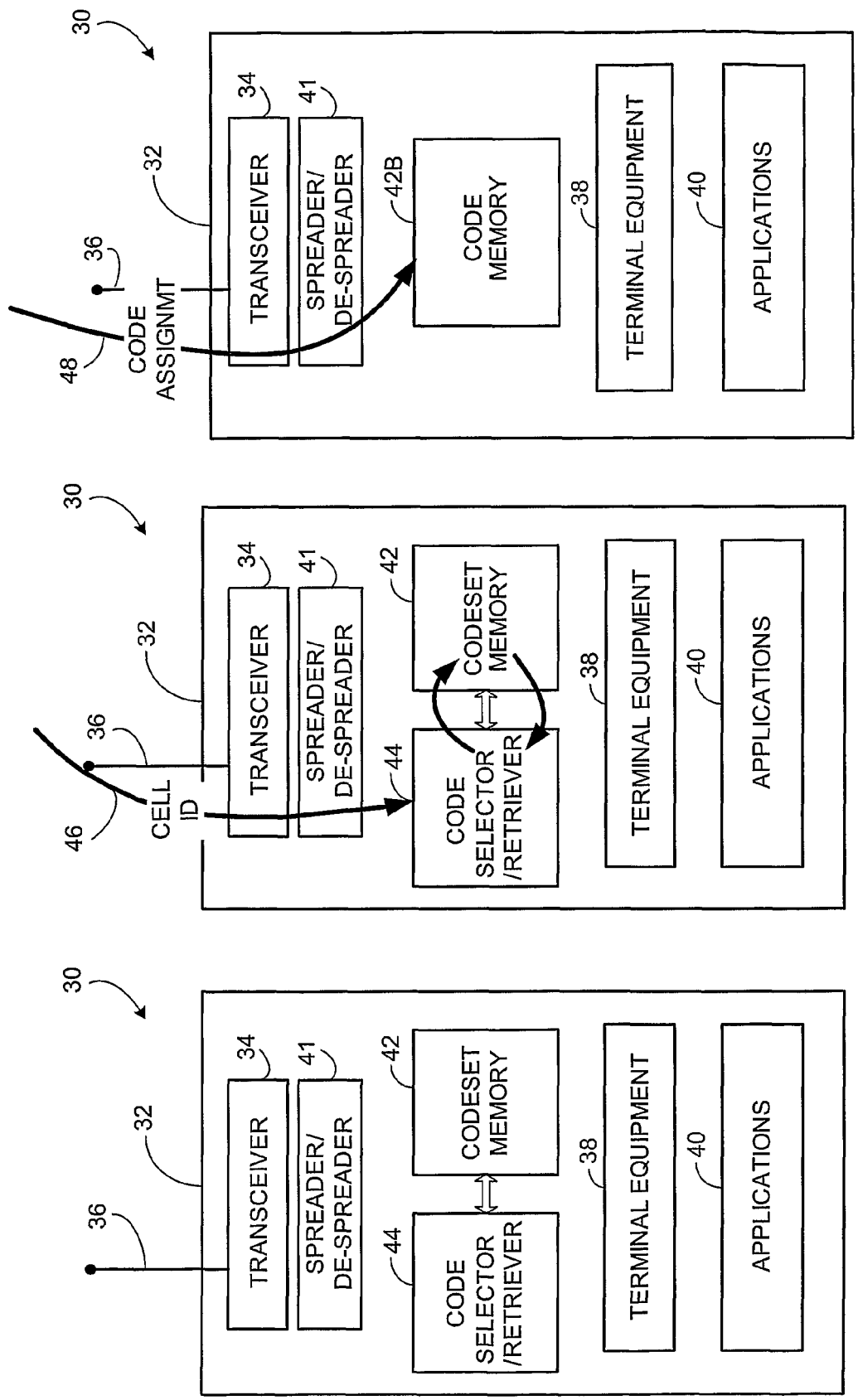
FIG. 2 is a schematic view of an example user equipment unit that uses plural orthogonal codesets.

In the above regard, FIG. 2 shows an example user equipment unit 30, which can be a mobile station such as mobile telephones (cell phone) and laptops with mobile termination, and thus can be, for example, any portable, pocket, hand-held, computer-included, or car-mounted mobile device which communicates voice and/or data with a radio access network. The user equipment unit (UE) 30 has a case or housing 32, which accommodates, e.g., a transceiver 34. The 34 functions in conjunction with antenna(s) 36 for performing radio communications over a radio or air interface. In addition, switch 30 includes terminal equipment 38 and a set of applications 40. While the terminal equipment 38 includes an operating system and middlewear, the applications in set 40 can include (for example) voice applications, a browser, and email, or the like.

Further, user equipment unit 30 includes a spreader/despreader 41; a codeset memory 42; and, a code selector/retriever 44. The codeset memory 42 can be any suitable type memory, e.g., RAM or ROM, and has stored therein some or all of the plural orthogonal codesets usable by the switch 30. In various implementations, the code selector/retriever 44 fetches or obtains from code memory 42 a (e.g., prescribed) spreading code for use by transceiver 34 of switch 30 in communicating with the radio access network.

FIG. 2A illustrates a scenario in which the user equipment unit 30 receives (as shown by arrow 46) an indication from the radio access network of the identity of a cell in which the user equipment unit 30 now operates. The code selector/retriever 44, knowing the cell identity, has logic to choose an appropriate plural orthogonal codeset from codeset memory 42 based on the cell identity.

FIG. 2B illustrates a scenario in which the user equipment unit 30 receives (as shown by arrow 48) a code assignment from the radio access network, e.g., in a code assignment message. The code selector/retriever 44, knowing the code assignment, retrieves the assigned code from among the plural orthogonal codeset in code memory 42B.

Figure 3:
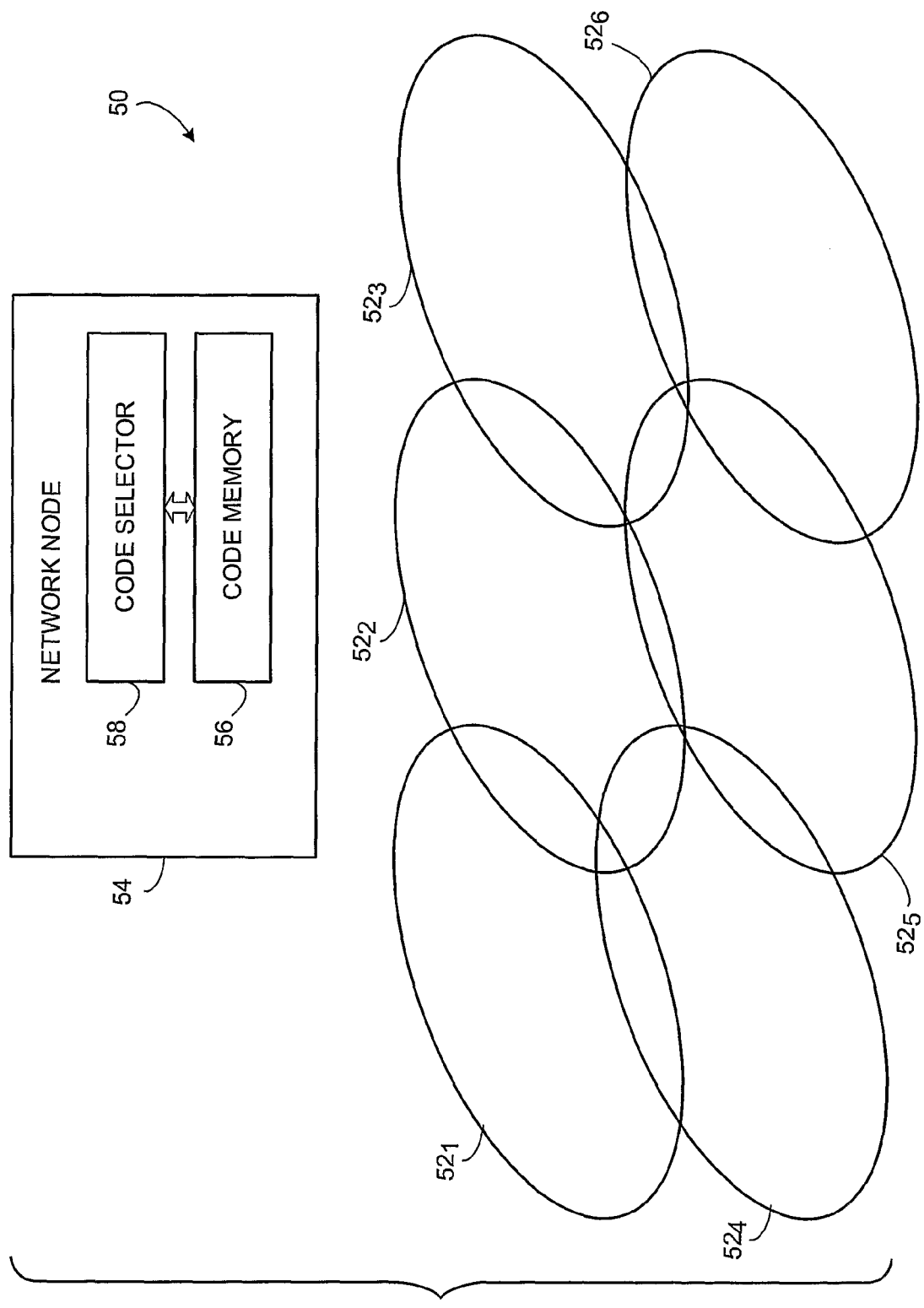
FIG. 3 is a diagrammatic view of an example generic CDMA network that uses plural orthogonal codesets.

The plural orthogonal codesets can be utilized for operation of a CDMA communications network, such as a generic RNC power control process unit 50 shown in FIG. 3 as having a service area comprising cells 52 that re-use same spectral resources. The CDMA network 50 comprises at least one network node 54 for selecting, from the plural orthogonal codesets, a codeset for use in each cell, a codeset in one cell being different than a codeset in an adjacent cell apart from having at least one code in common. The network node 54 comprises a memory 56 for storing plural orthogonal codesets (the plural orthogonal codesets having at least a first code in common with one another) and a code selector 58 for selecting a specified codeset from the plural codesets for use for each set.

Figure 3A:
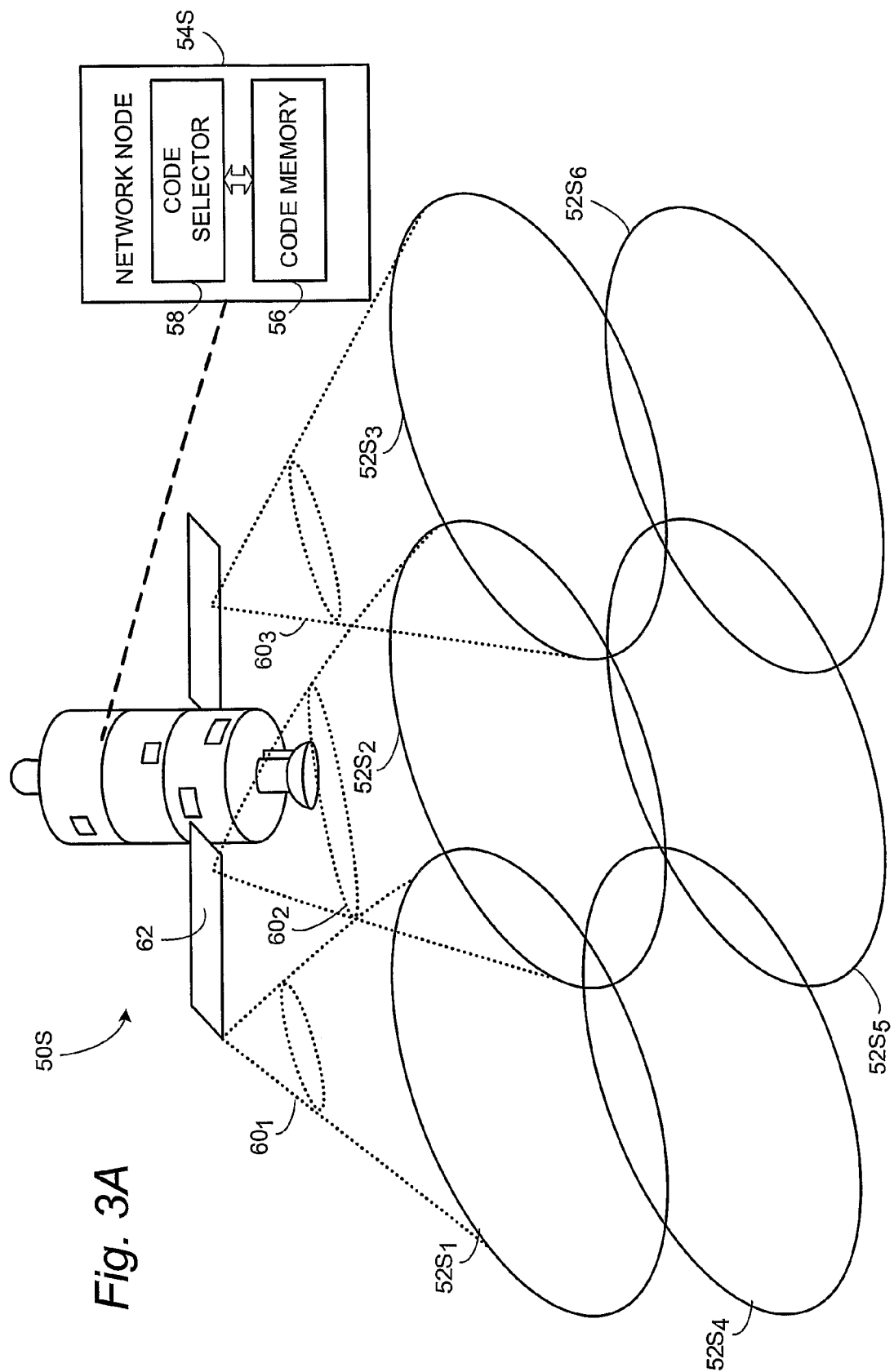
FIG. 3A is a diagrammatic view of an example satellite network that uses plural orthogonal codesets.

As an example CDMA network, the invention is useful in a satellite system such as satellite system 50S shown in FIG. 3A. The satellite system 50S covers its service area (e.g., cells 52S) with a plurality of beams 60 using a multibeam satellite antenna 62. Instead of radiating a separate pilot code for each beam and thereby causing interbeam interference due to the strong pilot code signals, the common code in all codesets described herein may be used as a common pilot in all beams, and the radiation in all beams may be correctly phased so that constructive addition occurs at beam edges to produce a substantially uniform pilot signal illumination of the entire, multi-cell service area.

The satellite system 50S of FIG. 3A includes a network node 54S which includes a code memory 56 and code selector 58. The network node 54S may include a transmit signal generator for producing CDMA signals based the CDMA spreading codes for radiation in the beams of the satellite system, each code being orthogonal to as many other codes as possible that are radiated in the same or adjacent beams and non-orthogonal to other codes radiated to more distant geographical areas. The network node 54S may be a terrestrial node in remote communication with the satellite, or may be borne by the satellite.

Figure 4:
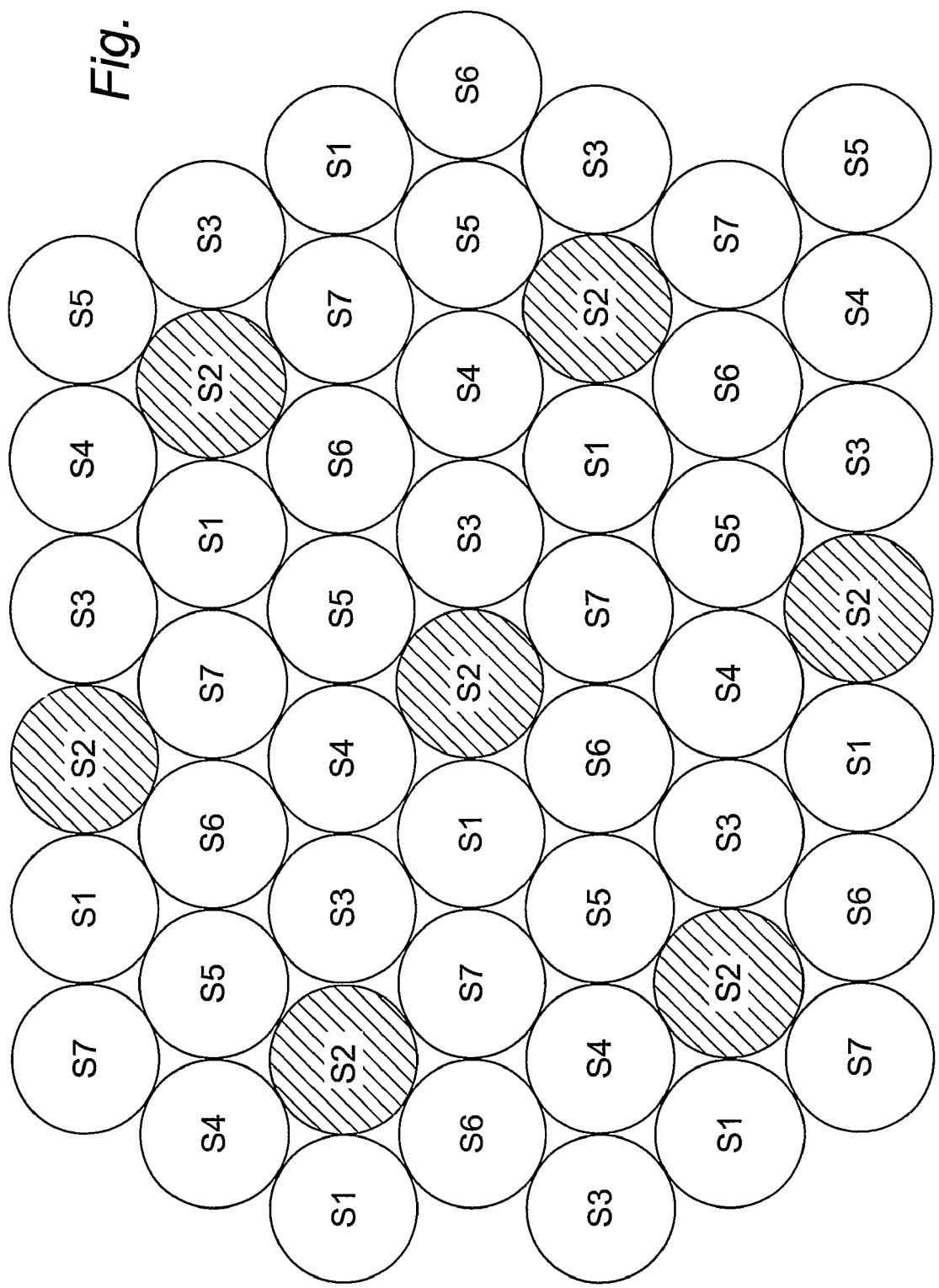
FIG. 4 is a diagrammatic view of showing a code re-use scheme in a multicell service region.

The traffic signals using other codes in a given bean are thus orthogonal to all pilot code radiation of whichever beam, while nevertheless having low correlation with traffic codes used in adjacent beams. The existence of at least seven codesets having minimum correlation allows codeset usage to be distributed according to a seven-cell re-use pattern such that the same codeset is not used in nearby areas. A 7-cell codeset reuse pattern is shown in FIG. 4. The hatched cells in FIG. 4 show the instances where the same codeset S2 is reused, and the other codesets S1, S3, . . . S7 are reused with the same distance spacing.

In some cases, repeating use of the exact same codeset may be avoided by choosing, instead of the exact same codeset, a codeset that has equivalent cross-correlation to its six surrounding neighbors. This can be regarded as performing code allocation with a larger number of starting codes, not all of which have the lowest cross-correlation, but ensuring that the lowest cross correlation always pertains between neighbors. This procedure is similar to the procedure known in analog cellular systems for avoiding the use of adjacent frequency channels in adjacent cells. Methods to generate this much larger set of codesets are given below.

In cellular systems, conventional CDMA techniques do not allow orthogonality to be accurately maintained when the propagation channel is a multi-path channel, or when propagation delay differences between different stations result in time-misalignment between signals. However, U.S. Pat. Nos. 6,215,762 and 6,359,874 (both incorporated herein by reference) describe a CDMA technique in which orthogonality is insensitive to multipath or time misalignment. The current technology described herein may be used together with these techniques to achieve the specified levels of cross-correlation between other signals provided by the inventive codesets despite multipath propagation.

Figure 3B:
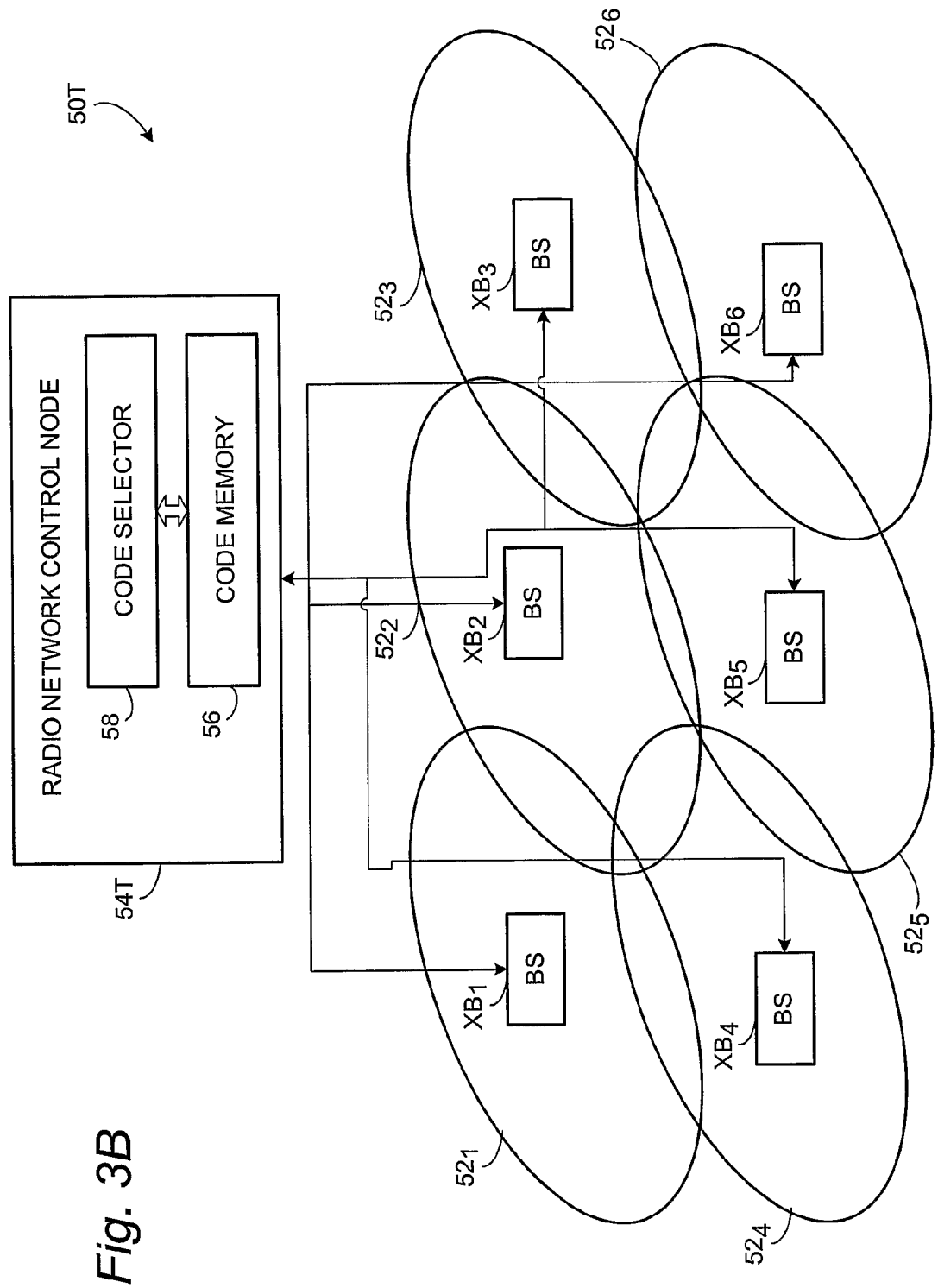
FIG. 3B a diagrammatic view of an example terrestrial CDMA cellular network.
Figure 5:
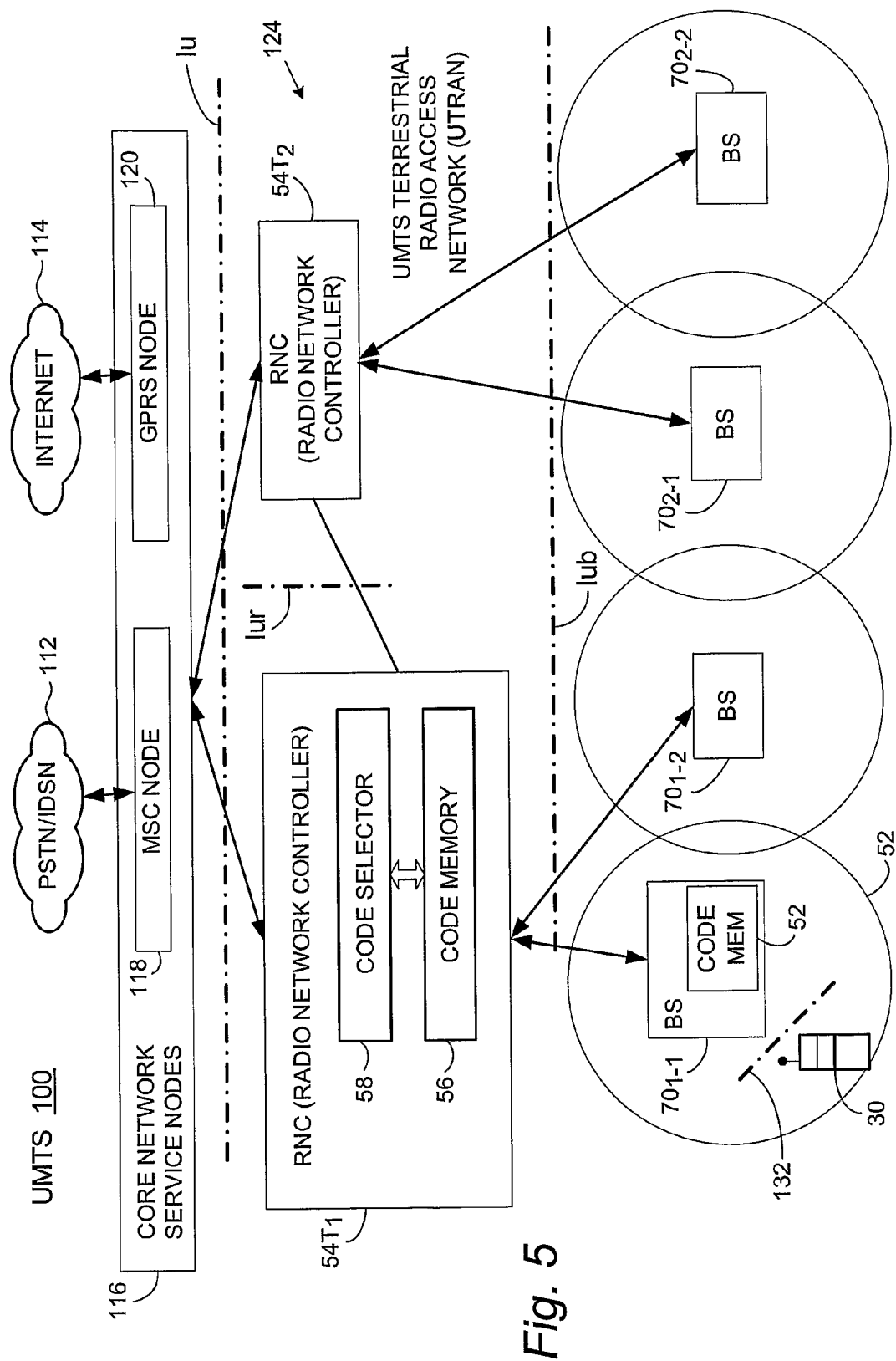
FIG. 5 is a schematic view of an example terrestrial CDMA cellular network that uses plural orthogonal codesets.

FIG. 3B together with portions of FIG. 5 illustrate a terrestrial CDMA cellular network 50 T wherein a user equipment unit 30 performs code division multiple access (CDMA) radio communications with a radio access network. The radio access network (RAN) comprises a radio network controller node (RNC) 54T, which is connected to one or more radio base station (RBS) nodes 70.

FIG. 5 shows a non-limiting, example context of a universal mobile telecommunication system (UMTS) 100 in which the radio base station nodes 70 and radio network controller (RNC) 54T of embodiments described herein may be employed. A representative, connection-oriented, external core network, shown as a cloud 112 may be for example the Public Switched Telephone Network (PSTN) and/or the Integrated Services Digital Network (ISDN). A representative, connectionless external core network shown as a cloud 114, may be for example the Internet. Both core networks are coupled to their corresponding service nodes 116. The PSTN/ISDN connection-oriented network 112 is connected to a connection-oriented service node shown as a Mobile Switching Center (MSC) node 118 that provides circuit-switched services. The Internet connectionless-oriented network 114 is connected to a General Packet Radio Service (GPRS) node 120 tailored to provide packet-switched type services which is sometimes referred to as the serving GPRS service node (SGSN).

Each of the core network service nodes 118 and 120 connects to a UMTS Terrestrial Radio Access Network (UTRAN) 124 over a radio access network (RAN) interface referred to as the Iu interface. UTRAN 124 includes one or more radio network controllers (RNCs) 54T. For sake of simplicity, the UTRAN 124 of FIG. 5 is shown with only two RNC nodes, particularly RNC $54T_1$ and RNC $54T_2$. Each RNC 54T is connected to a plurality of radio base stations (RBS) 70. For example, and again for sake of simplicity, two radio base station nodes are shown connected to each RNC 54T. In this regard, RNC $54T_1$ serves radio base station $70_{1-1}$ and radio base station $70_{1-2}$, while RNC $54T_2$ serves radio base station $70_{2-1}$ and radio base station $70_{2-2}$. It will be appreciated that a different number of radio base stations can be served by each RNC, and that RNCs need not serve the same number of radio base stations. Moreover, FIG. 5 shows that an RNC can be connected over an Iur interface to one or more other RNCs in the URAN 124. Further, those skilled in the art will also appreciate that a radio base station is sometimes also referred to in the art as a node B, or B-node.

In the illustrated embodiments, for sake of simplicity each radio base station 70 is shown as serving one cell. Each cell is represented by a circle which surrounds the respective radio base station. It will be appreciated by those skilled in the art, however, that a radio base station may serve for communicating across the air interface for more than one cell. For example, two cells may utilize resources situated at the same radio base station site.

A user equipment unit (UE), such as user equipment unit (UE) 30 shown in FIG. 5, communicates with one or more cells or one or more radio base stations (RBS) 70 over a radio or air interface 132. Each of the radio interface 132, the Iu interface, the Iub interface, and the Iur interface are shown by dash-dotted lines in FIG. 5.

In the radio access network (RAN) of FIG. 3B and FIG. 5, a radio access network 54T node comprises a memory 56 for storing plural orthogonal codesets (the plural orthogonal codesets having at least a first code in common with one another) and a code selector 58 for selecting a specified code from the plural codesets for use by the user equipment unit in performing the radio communications between the user equipment unit and radio access network. The network further comprises means for transmitting the specified code or an indication of the specified code to the user equipment unit. For example, the transmitting means can include at least one radio base station node 70 for transmitting into a corresponding cell. The radio base station 70 can also have a code memory for storing one or more of the plural orthogonal codesets.

Figure 6:
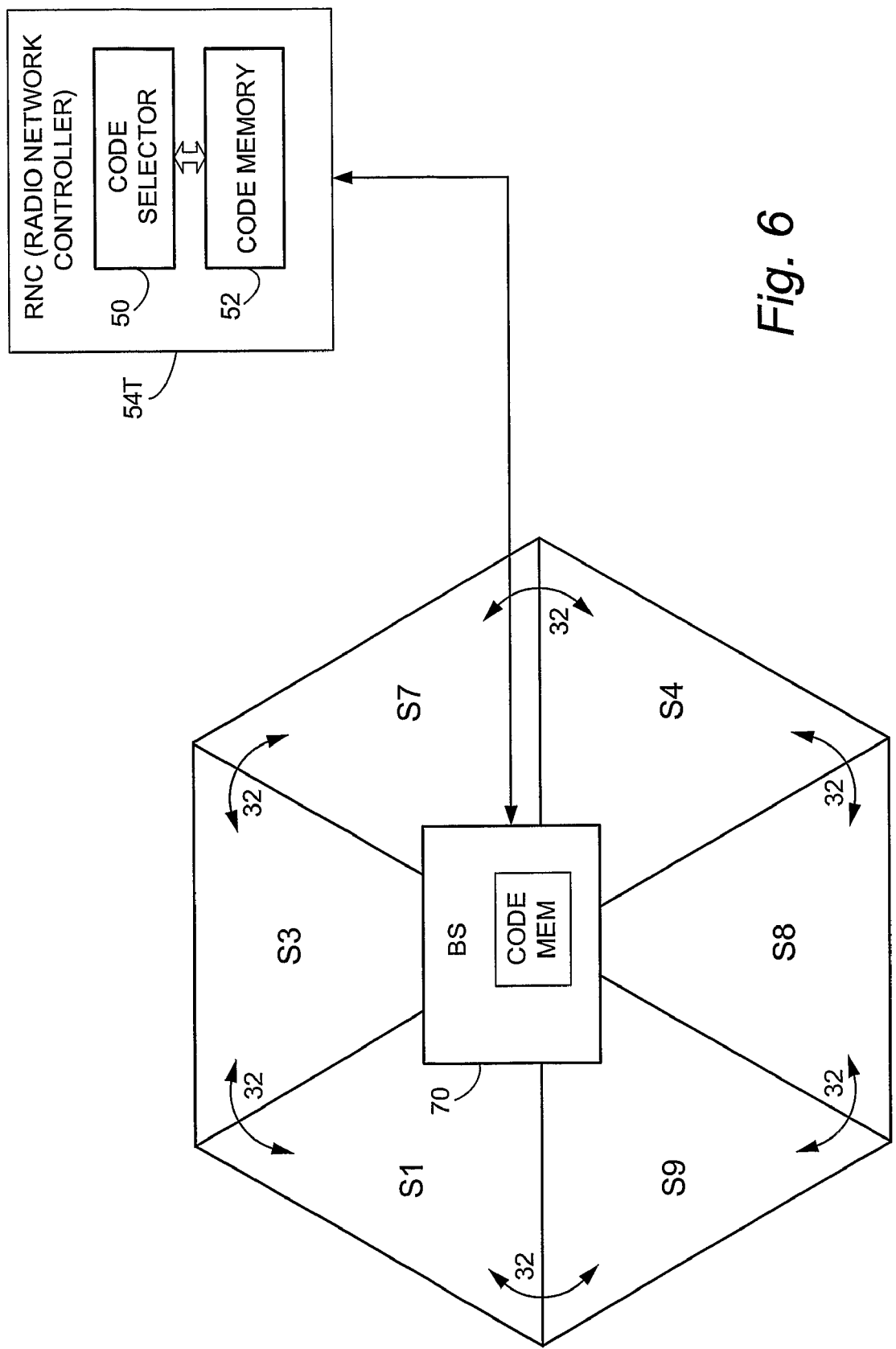
FIG. 6 is a diagrammatic view of a sectorized cell handled by a base station node that uses plural orthogonal codesets.

In a sectorized cellular system such as that shown in FIG. 6, a base station divides 360 degrees of azimuth into a number of independent sectors, usually 3, 4 or 6, and is able to serve different mobile stations in different sectors from the same antenna tower. In CDMA systems, the same frequency channel may be used in all sectors, providing the codes used are different. Within a sector, the codes should be orthogonal, and between adjacent sectors, the codesets should have minimum correlation. FIG. 6 shows how the length-256 codes whose cross-correlation properties are given in Table 16 can be allocated to sectors such that the worst case correlation between any code in one sector and any code in an adjacent sector is 32/256, or −18 dB. Since the sector antennas are colocated, the propagation delay for all sector signals is the sane, so this reduction in zero-lag correlation is useful. Moreover, there is one common code in each sector, which, if not suitable for a pilot code, may be suitable for other purposes such as a calling channel. A common calling channel code can be used if the call setup capacity it provides is sufficient for all 6 sectors, and reduces interference between sectors. In addition to the adjacently used codesets having a worst-case correlation of 32/256, a large number of codes in one sector are orthogonal any given code in the adjacent sector as a consequence of Parseval's theorem, which requires the rms correlation to be 16/256. Thus mobiles near the edge of one sector can be allocated codes that are orthogonal at least to the strongest of the signals in the adjacent sector. The common code may be employed as the broadcast control channel for all sectors, as this is one of the most strongly radiated codes. Alternatively. codesets with two common codes may be constructed, and the codes allocated to the pilot code and the broadcast control channel, alternating their use between adjacent sectors such that the same pilot code is not used in adjacent sectors.

Having established the utility of employing different orthogonal codesets with one or more members in common, some other methods of finding such codesets will be given.

Figure 7:
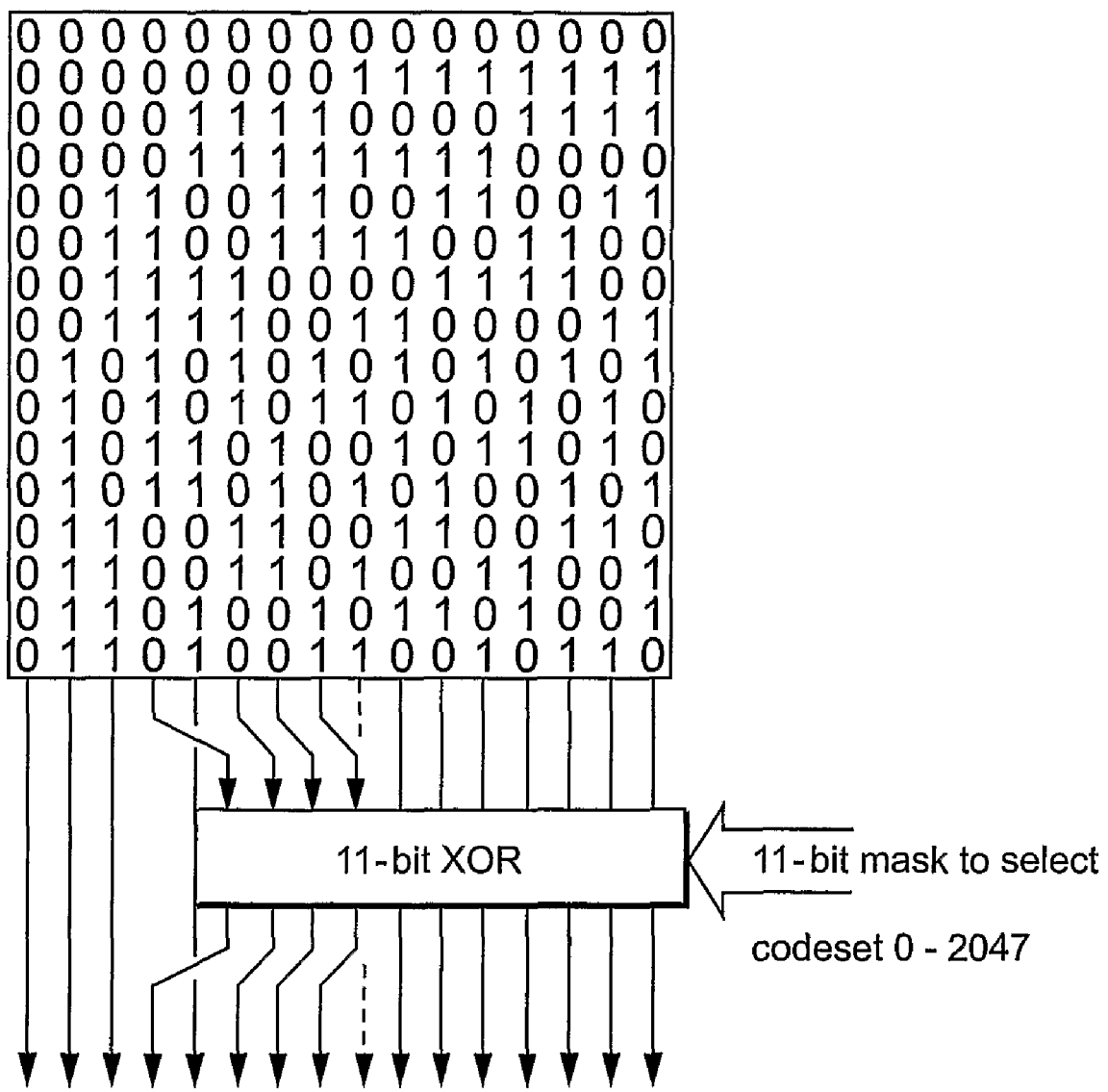
FIG. 7 is a diagrammatic view partition a set of codes into orthogonal codesets.

If the code length is short, for example 16 bits, there are only 32768 codes in total, discounting complements, and so computer searches of all codes in order to discover orthogonal groups is possible. Then attempting to partition a set of codes into orthogonal codesets, it is a question to be answered whether an exact partitioning is possible, e.g. whether all 32768 codes can be exactly separated into 2048 sets of 16 orthogonal codes, without a number of leftover codes remaining that do not form useful sets. In this case, a perfect partitioning is possible, by the following method, which is illustrated with the help of FIG. 7. Starting from a known set such as the Walsh-Hadamard codeset, an 11-bit modifying value is exclusive-ORed (i.e., XORed) to eleven selected bits of each codeword to produce a new codeset. It is simplest to describe which eleven of the sixteen bits are selected by identifying those that are not selected to be modified. The unmodified bits are the leftmost bit (always zero) and the four bits lying in columns, the bit patterns of which form the basis vectors of the Walsh-Hadamard set. The unmodified bits are even more simply described as lying in columns 0, 1, 2, 4, 8 . . . etc.

A different four bits could be selected to be left unmodified, providing the columns containing them were equivalent to basis vectors, i.e. four linearly-independent vectors in modulo-2 arithmetic.

The 11-bit modifier can be cycled through all 2048 values, with each combination producing a different codeset. It is easy to see how to extend this principle to codesets of any size, namely, to bitwise add an $N-1-\log_2 N$ bit modifier to all bits except those in the all-zeros column and those $\log_2 N$ bits in columns equating to the basis vectors, which are column numbers that equal a power of two.

For example, for length 64, the modifier is a 64-1-6=57-bit modifier, so the number of different codesets that can be produced is $2^{57}$ which is over $10^{17}$. In the present instance however, when we are interested only in codesets that contain for example the all zeros code in common, the set of all 16-bit codes to be partitioned is the set of 6435 codes containing 8 ones in the rightmost 15 places and zeros elsewhere. A direct search of this codespace to produce groups of 15, non-zero, mutually orthogonal codes can be done, but is an extremely lengthy search, as the partitioning is not unique, and one partitioning may yield a greater number codes with fewer leftover codes than another. Moreover, a direct search becomes impractical for longer codes. Therefore a method is required that can be efficiently extended to longer codesets. Such a method can be found be studying the properties of column permutations on a codeset.

Any pattern of column permutations of a codeset, iteratively repeated, will return the codeset to its starting state after a characteristic number of repeats, forming a closed cycle. For example, consider the column permutation

1->3
2->5
3->4
4->1
5->8
6->7
7->6
8->9
9->2

This permutation contains the cycles 1->3->4->1 of length 3
2->5->8->9->2 of length 4
and 7->8->7 of length 2

The entire permutation repeats the starting codeset in a characteristic number of iterations given by the LCM of the cycle sizes, namely 12. To maximize this number for permuting 15 columns of a 16-bit codeset, the sub-cycle lengths add to 15 or less, while their LCM is to be maximized. Sub-cycle lengths that are mutually prime most efficiently employ the available sum-length of 15 to maximize their product.

If it is desired that no intermediate codeset contain a code used in another set, i.e. that each set of 15 codes in the cycle be distinct, then each sub-permutation applied alone must produce a sub-cycle of distinct codesets. This provides a method to screen out sub-permutations that would result in the full permutation failing to produce distinct codesets.

Because the bit columns are also orthogonal codes, any pair of columns differs in half its bit positions. Therefore interchanging a pair of columns changes half the codes and leaves the other half unchanged. Interchanging a selected pair of different columns can now change haft the codes that were not changed the first time, leaving one quarter of the codes unchanged. By correctly selecting the columns to permute, the number of codes remaining unchanged can be progressively halved until only one, the all zeros code, remains unchanged. The minimum number of columns that must be involved in a permutation that changes all non-zero codes is 5 in the 16-bit case, or in general $1+\log_2 N$.

Thus the allowable ways to partition the 15 columns into sub-permutations are

| | | |
|---|---|---|
| 5 + 10 | LCM = 10 | |
| 5 + 9 | LCM = 45 | This is the best for a length 5 sub-cycle |
| 6 + 9 | LCM = 18 | |
| 6 + 8 | LCM = 24 | |
| 6 + 7 | LCM = 42 | This is the best for a length 6 sub-cycle |
| 7 + 8 | LCM = 56 | This gives the longest cycle length of all |

Thus the best column permutation comprises a cyclic rotation of 7 selected columns and a cyclic rotation of the remaining 8 columns.

There are many ways to divide the 15 non-zero columns into a group of 7 and a group of 8 meeting the above requirements, and many ways to order the permutation within each group. For example, if columns 1-7 are grouped, they could be permuted in the order 1->2->3->4->5->6->7->1 or 1->3->7->5->2->6->4->1

It is also clear that columns 1-7 should not be grouped, if the starting codeset is a Walsh-Hadamard set, as such a permutation does not change code 0000000011111111. In the case of the 8-column permutation, if the columns are ordered such that the 8-permutation is a cyclic shift, no code can contain a bit pattern in those positions that short cycles, such as 10101010 (which repeats after two shifts) or 11001100 (which repeats after 4 shifts). This allows unpromising column selections and column orderings to be rapidly excluded.

The above methods allow each sub-permutation to be tested individually to find one that produces a cycle of distinct codesets. Thus the amount of trial and error is related to identifying 7-column permutations that produce length-7 cycles of distinct codesets; identifying permutations of the remaining 8 columns that produce length-8 cycles of distinct codesets, and then determining if the combination of a length 8 and corresponding length 7 cycle produces a length-56 cycle of distinct codesets. Moreover, this process can be carried out on more than one starting codeset simultaneously to find a permutation that cycles more than one codeset simultaneously through a set of 56 distinct codesets that do not clash in any code position with each other.

In this way, several permutations were identified that produced 3 cycles of 56 distinct codesets simultaneously when starting with the Walsh-Hadamard set and the two extended simplex codesets of length 16. Some such permutations are tabulated in Table 17.

TABLE 17

| Column | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| moves to | 2 | 13 | 1 | 11 | 15 | 8 | 3 | 12 | 4 | 7 | 6 | 5 | 14 | 10 | 9 |
| | 2 | 13 | 1 | 11 | 6 | 8 | 3 | 4 | 12 | 7 | 15 | 5 | 14 | 10 | 9 |
| | 2 | 13 | 4 | 6 | 12 | 5 | 9 | 15 | 1 | 7 | 3 | 8 | 14 | 10 | 11 |
| | 2 | 13 | 5 | 12 | 15 | 8 | 9 | 3 | 1 | 7 | 6 | 11 | 14 | 10 | 4 |
| | 2 | 14 | 6 | 1 | 4 | 10 | 5 | 15 | 13 | 8 | 7 | 9 | 3 | 11 | 12 |
| | 2 | 14 | 8 | 1 | 4 | 15 | 5 | 9 | 6 | 12 | 7 | 3 | 10 | 11 | 13 |
| | 2 | 14 | 12 | 1 | 4 | 9 | 5 | 3 | 8 | 13 | 7 | 10 | 15 | 11 | 6 |
| | 2 | 14 | 13 | 1 | 4 | 3 | 5 | 10 | 12 | 6 | 7 | 15 | 9 | 11 | 8 |
| | 2 | 15 | 4 | 7 | 10 | 5 | 1 | 12 | 14 | 8 | 6 | 9 | 3 | 11 | 13 |
| | 2 | 15 | 4 | '7 | 12 | 8 | 1 | 14 | 6 | 9 | 10 | 11 | 3 | 5 | 13 |
| | 2 | 15 | 4 | 7 | 14 | 9 | 1 | 6 | 10 | 11 | 12 | 5 | 3 | 8 | 13 |
| | 2 | 15 | 5 | 6 | 14 | 7 | 8 | 10 | 4 | 12 | 9 | 11 | 3 | 1 | 13 |
| | 2 | 15 | 6 | 1 | 7 | 4 | 8 | 10 | 12 | 13 | 9 | 5 | 11 | 3 | 14 |

A permutation may be denoted in a shorthand fashion simply by one of the above vectors of destination column numbers. By renumbering the columns, any of the above permutations can be made to look like a cyclic shift of 7 adjacent columns and a cyclic shift of the other 8 adjacent columns.

Choosing a particular permutation, such as (2, 15, 6, 1, 7, 4, 8, 10, 12, 13, 9, 5, 11, 3, 14) which may be seen to be comprised of
   the length=7 sub-cycle 1-2-15-14-3-6-4-1, and
   the length=8 sub-cycle 5-7-8-10-13-11-9-12-5,
a trial of other codesets than the three already determined to cycle can be performed to see if more than those three codesets can be simultaneously cycled. In this way, the following additional two codesets, expressed in hexadecimal (HEX), were found:
11D7 163B 1ABC 256E 29B9 2E96 3F1 478D 485A 4CE3 5D34 6275 73A2 74D8 780F and
17F EB6 1F29 27C3 365C 38F1 398E 4BD8 549B 55E4 5A47 62AD 6C6A 6D15 7332

Thus in total, five codesets can be simultaneously cycled through 56 distinct codesets by the particular permutation given above, making 280 codesets of 15 codes. Thus 4200 of the 6435 codes having equal numbers of 1's and 0's were successfully grouped into orthogonal codesets by this method, which is much quicker than an attempt to partition the 6435 codes into sets one at a time. The remaining 2235 codes may contain some codesets but they are not cycled by the same permutation. Indeed, certain codes cannot be cycled by the particular combination of a 7 cycle and an 8 cycle—obviously the code containing 1's in the 8-cycle positions and 0's in the 7-cycle positions does not change. Other bit-patterns such as 01010101 clearly do not make an 8-cycle as they repeat after two cyclic shifts. These codes may be excluded from testing as they will not produce the desired length 56-cycles.

The extra codesets found above do not have the minimum correlation with the Walsh-Hadamard and Simplex sets, but their 56-cycles may be rotated relative to the Walsh-Hadamard and simplex 56-cycles to attempt to align a mutated version of the code with the Walsh-Hadamard and simplex sets which has the most favorable correlation. The mutual correlation between codesets is unchanged when all are subjected to the permutation the same number of times. Expressed mathematically:

CORRELATION($P^n(S1),P^n(S2)$)=CORRELATION (S1,S2)

Letting $S2=P^k(S1)$, it also follows from the above that

CORRELATION($S1,P^K(S1)$)=CORRELATION($P^n(S1),P^{n+k}(S1)$)

which means that, if a desirable correlation can be found between two codesets k-apart in the same cycle, then that correlation applies to all codeset pairs k-apart such as (4,4+k), (23,23+k) and so on. Thus by selecting codesets from around the cycle in steps of k, modulo-56, the cycle may be reordered such that adjacent codesets will all have the desirable correlation.

Figure 8:
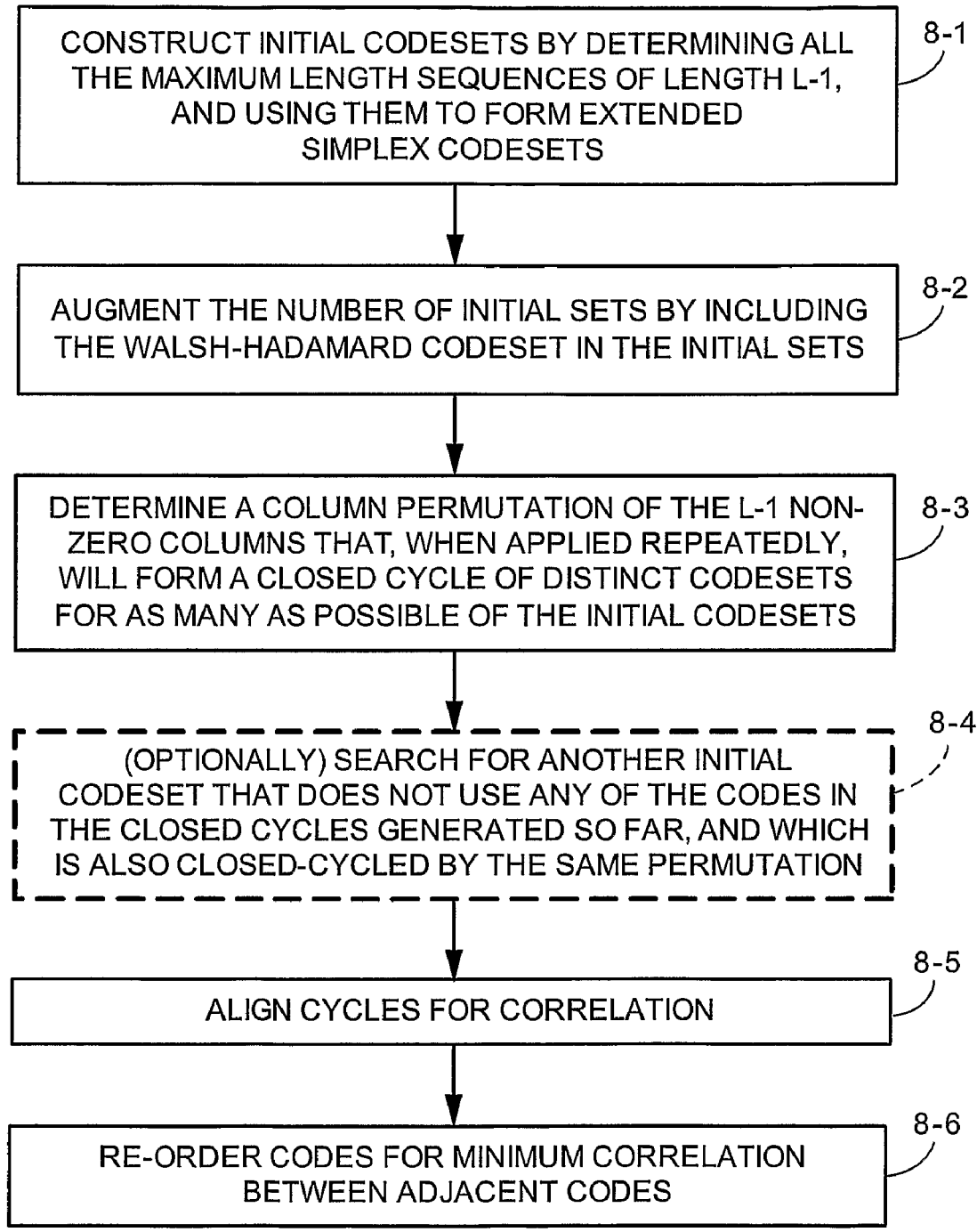
FIG. 8 is a flowchart showing example basic steps involved in a method of preparing a codeset.

Using the above rules, exemplified for the length=16 codeset, codesets of greater codelength can be found. The method can include some or all of the following basic, example steps as illustrated in FIG. 8:

(Step 8-1) Construct initial codesets by determining all the maximum length sequences of length L-1, and using them to form extended simplex codesets.

(Step 8-2) Augment the number of initial sets by including the Walsh-Hadamard codeset in the initial sets.

(Step 8-3) Determine a column permutation of the L-1 non-zero columns that, when applied repeatedly, will form a closed cycle of distinct codesets for as many as possible of the initial codesets. This permutation may be obtained by:
   (a) Splitting the L-1 columns into subgroups preferably of mutually prime lengths not less than $\log_2(L)+1$
   (b) Ensure that no group contains in any individual code an all zeros or all ones bit pattern, nor a bit pattern that, cyclically shifted, repeats in a number of shifts less than the subgroup length
   (c) Verify that each subgroup of columns, when cyclically permuted alone, produces a closed cycle of distinct codesets for as many of the initial codes as possible.
   (d) Where any initial codeset forms closed cycles for all of the subpermutations in step (c), verify that applying all the subpermutations simultaneously forms a closed cycle of distinct codesets equal in cycle length to the LCM of the sub-cycle lengths.
   (e) Varying the partitioning of the columns into subgroups and the order of the columns in each subgroup and repeating tests (b), (c) and (d) until the best permutation is found. Test (d) may be omitted whenever the number of initial codesets that form closed cycles for all subpermutations is less than the largest number found for the best permutation so far.

NOTE: The process of determining whether a code encountered by permuting a previous codeset has been encountered before in any cycle may be speeded up if the number of codes having the obligatory 50% 1's and 0's content is small enough to store a 1-bit flag for each indicating whether it has already been used or not. The number of such values is 6435 for L=16 and about 300 million for L=32 (300 megabits or 38 megabytes of memory required), the latter being within the capability of most PCs at the time of filing. For L=64 or greater, this may not be a practical method, and instead, codewords may be sorted according to bit pattern as they are encountered into a data structure, and a system of pointers used to quickly direct a enquiry to the right area of the data structure, analogous to looking for a name in a telephone directory sorted in alphabetical order, It is not necessary to perform an excessively thorough search, as the number of codesets that are needed for practical use is likely to be less than 1000.

(Step 8-4) Having determined a permutation that successfully permutes the greatest number of initial codesets, one may optionally search for another initial codeset that does not use any of the codes in the closed cycles generated so far, and which is also closed-cycled by the same permutation. A method of doing this can be as follows:

(a) Starting with the all-zeros code, increment through the allowed codes to determine the first unused code, according to any of the techniques mentioned in the above note, and which is closed-cycled by the same permutation as for the existing codesets without encountering an already used code; if so, mark the codes in this cycle temporarily used;

(b) Continue to increment through the allowed codes to identify another unused code orthogonal to that found in (a) and to others identified so far. If the end of the allowed codes is reached, reject the last code found, unmark the temporarily marked codes and continue incrementing from its location to find an alternative code;

(c) Repeat step (b) until L−1 non-zero, mutually orthogonal codes are found. Since each was verified in step (a) to have a unique closed-cycle, the whole codeset has a unique closed-cycle.

(Step 8-5) Having found the desired number of closed cycles, compare codesets at the first position in each cycle to determine their mutual correlation. If the correlation of any codeset with the others is higher than the minimum, rotate its cycle until a code having a more desirable correlation is brought into the first position. In this way, the cycles can be aligned so that codesets in the same position of their respective cycles all have the most desirable correlation one with another.

(Step 8-6) The correlation between codes distance 'k' apart in the same cycle can be computed to determine the distance 'k' between codesets that exhibit minimum correlation. The cycles can then be reordered by stepping through them in steps of k modulo the cycle length such that the reordered codes now exhibit minimum correlation between adjacent codes.

Ideally, it is desired to find a value for k that works simultaneously for the greatest number of the closed cycles; then the codesets will exhibit minimum correlation both across different cycles at the same position, and between adjacent codes of the same cycle, effectively a two-dimensional ordering of codes with minimum correlation between neighbors.

This facilitates determining how codes should be allocated to, for example, the cells or sectors of a CDMA cellular system covering a two-dimensional service area.

Codesets would normally be found by the above method during a design phase and stored in the equipment for implementing the invention. For example, alternative codesets could be stored in a mobile terminal memory and in the fixed-station network. When a communication was initiated, the network would select a code to assign to the terminal that was (a) not currently used in the area covered by the same base station antenna (b) preferably orthogonal to the already used codes in the area (c) preferably orthogonal to at least the strongest interfering signals from other areas, or, if not possible, a code having minimum correlation with the strongest interfering signals would be allocated.

The selected code would then be communicated to the terminal by identifying which codeset to select and which code or codes within the codeset to employ.

Considering the partitioning of all 32768 16-bit codes into 2048 codesets defined by an 11-bit modifier, 11 bits would need to be communicated to the mobile station to identify which of the 2048 codesets to select, followed by 4 bits to select the code within the codeset. Clearly, it is just as efficient to transmit the 15 non-zero bits of the assigned code to the mobile terminal, obviating the need to store codesets in the terminal. Terminals are then fully flexible and the network may decide the code to assign by any technique. The preferred implementation therefore comprises the network identifying the bit pattern of a code to assign to a particular terminal that will optimize communication with that terminal, and then transmitting the bit pattern of the code in a channel-assignment message along with other parameters of the prior art, such as frequency channel assignment, data rate, traffic type (fax, data, voice) etc.

One application of the invention is for multi-beam satellite communications systems using CDMA with a pilot code radiated to provide a continuous phase reference. If the same system was used as in prior art cellular systems, a different pilot code would be radiated in each beam. This is necessary in cellular systems because the propagation channel from a base station to a given mobile station is not the same for two signals radiated with different antenna patterns, and therefore it is necessary to have a pilot "per beam" i.e. per cell or sector. In a satellite application, however, the propagation channel from the satellite to any given mobile station is the same for all signals, providing those signals illuminate the immediate vicinity of the mobile station uniformly; then all reflecting objects that could distort the propagation channel reflect equally for all signals. Only reflecting objects within a few tens of meters or hundreds of meters at most can reflect a signal to the mobile station antenna that is significant in comparison with the direct wave. Since a satellite beam is 100's of kilometers wide at the −368 points, the power density slope over a few hundred meters is negligible. Therefore, since all reflecting objects in the vicinity of the mobile are equally illuminated, however wide the satellite might be (1005 or 10005 of kin) the propagation channel will be the same for a spot beam as for a global beam. This allows the same pilot to be radiated in a "global beam", i.e. one that covers all cells, while retaining phase coherency with the traffic signals in spot beams.

More specifically, a satellite forms beams by feeding multiple antenna elements with appropriately phased versions of the signal to be beam-formed. If the propagation or coupling between antenna element i and mobile station j is denoted by Cij. and the antennas are driven with an amount Iii of the pilot signal P, then mobile station j receives a pilot signal Pj given by:

$$Pj = P \sum_i Ui, Cij$$

If now the antenna elements are fed with an amount Vij of signal Sj destined for mobile station j, the mobile station receives a signal Rj given by $$Rj = Sj \sum_i Cij, \; Vij$$

To ensure that the phase relationship between the pilot Pj received and the signal Rj received is the same as between the signal Sj transmitted and the common transmitted pilot P, then the two quantities $$\sum_i Ui, \; Cij \text{ and } \sum_i Vij, \; CIJ$$

must be in phase. Having full control over the Vij for each individual mobile station, this is easy to arrange. Independently, the relative phases and amplitudes of the Ui may be chosen to obtain the desired pilot beam shape likewise the vii may be chosen to obtain the desired traffic beam shape to station j. If desired, the pilot beam shape can be chosen to avoid radiating pilot wasted energy in cells known not presently to contain any stations or traffic, for example areas of ocean. Alternatively the pilot power in cells with little traffic can be reduced and the small number of traffic signals in those cells slightly increased in power level to compensate, while transmitting higher pilot power in cells with much traffic, to enable the bulk of the traffic signals to be reduced in power. By thus maximizing power efficiency for heavily loaded beams at the expense of lightly loaded beams, overall satellite power efficiency can be improved. The interference between adjacent cells is already reduced by the use of a common pilot, orthogonal to all signals, and may be further reduced by ensuring that signals in less than fully loaded cells give priority to using codes that are orthogonal to those used in neighboring beams, especially those used by the strongest interfering signals. As described herein, these benefits are achieved by using different codes or sets of codes in different beams or cells, while scrambling each with a common real or complex scrambling code so as to preserve their relative properties. This is in contrast with current systems, which do the opposite, namely use common codesets in every cell or beam that are then rendered different by use of different real or complex pseudorandom scrambling codes, thereby losing control over the relative beam-to-beam code correlation properties.

Another method for constructing codesets having two common members is to start with forming the 2N×2N bit matrix $$\begin{matrix} c & c \\ c & -c \end{matrix}$$

where −c means the complement f the first code in C is denoted by ci then the above codeset contains the codes $$\text{and } \begin{matrix} c1 & c1 & \text{in the first code position} \\ c1 & -c1 & \text{in the } N-1 \; th \text{ code position.} \end{matrix}$$

If the rightmost N bits of codes 2−N and codes N+2 are then cyclically shifted vertically to be paired with different leftmost N-bit half-words, different codesets result for each cyclic permutation apart from all having codes c1 c1 and c1 −c1 in common. Moreover, the mutual correlation between these codesets is the same, codes from one set, apart from the common codes having ¾ of their bits the same and ¼ different than the nearest code in any other set, a maximum correlation of −6 dB.

Yet different codesets may be formed by applying the same procedure to mixed codesets such as

W S

W −S where N is the Walsh Hadamard codeset of length N and S is an extended simplex codeset of length N. Various other such combinations can be formed with easily determined correlation properties, such as codesets W S1 and S1 S2

W −S1 S1 −S2 where S1 and S2 are two different extended simplex sets. Since the correlation between the first half W of the first codeset and the first half S1 of the second codeset is desirably low, and likewise the correlation between the second half 51 of the first codeset and the second half S2 of the second codeset is also desirably low, then the correlation between the length 2N codesets is desirably low whatever permutation of the pairing of rightmost N-bits with leftmost N-bits is used (apart from codes 1 and N+1, which do not participate in the permutation).

Such codesets having two codes in common to each other can be employed in a cellular system by using the two common codes for a pilot code and a broadcast control channel code, the pilot signals and the broadcast control channel signals being the strongest radiated in any sector. It may not be desirable to use the same pilot code in each sector, unlike in a satellite system, where this is desirable. However, depending on the distribution of multipath-causing, reflecting objects in a cell, the use of a pilot code common to all sectors may still give good results in a cellular system. In that case, the same broadcast control channel code can be used in all sectors too, broadcasting the same call alerts in each sector. Alternatively, the first common code can be used for pilot in even-numbered sectors and the second common code can be used as a pilot channel code in odd-numbered sectors.

The pilot channel and broadcast control channel are usually the lowest datarate channel that use the most spreading, i.e. the longest spreading codes. For example, in the WCDMA 3G cellular system, codes of length 256 can be used. In a 4-sector system, unique pilot codes and broadcast control channel codes can be allocated to each sector while still maintaining both orthogonal to all traffic by devising codesets of length 256 that have 8 codes in common. For example, expressed in HEX for brevity, the 8 codes of Table 18 can be chosen to be common.

TABLE 18

```
0  0000000000000000000000000000000000000000000000000000000000000000
1  00000000000000000000000000000000FFFFFFFFFFFFFFFFFFFFFFFFFFFFFFFF
2  0000000000000000FFFFFFFFFFFFFFFF0000000000000000FFFFFFFFFFFFFFFF
3  0000000000000000FFFFFFFFFFFFFFFFFFFFFFFFFFFFFFFF0000000000000000
4  00000000FFFFFFFF00000000FFFFFFFF00000000FFFFFFFF00000000FFFFFFFF
5  00000000FFFFFFFF00000000FFFFFFFFFFFFFFFFFFFFFFFF00000000FFFFFFFF00000000
6  00000000FFFFFFFFFFFFFFFF0000000000000000FFFFFFFFFFFFFFFF00000000
7  00000000FFFFFFFFFFFFFFFF00000000FFFFFFFF0000000000000000FFFFFFFF
```

The above codes are all combinations of the Walsh-Hadamard basis vectors which are codes 0, 1, 2 and 4. If the codeset of length 256 is subjected to a column permutation that leaves these basis vectors unchanged, then the resulting codesets will contain all 8 of the above codes in common. The column permutation having this property comprises a sub-permutation of the rightmost 32 columns, a separate permutation of the next 32 columns moving left, and so on with a final sub-permutation of the 31 columns to the right of the leftmost column.

Permutations can be devised such that the permuted codesets have maximum distance between sub-codesets of size 32 formed by carving the codeset of length 256 vertically into eight. This ensures that higher datarates using spreading code lengths of 128, 64 or 32 will also have a good distance between their counterparts in adjacent sectors. One such set of codesets can be obtained by starting with the extended simplex sets of length 32, and denoting these by $S32(i)$, forming 4 length 256 codesets by the following successive expansion Define $S64(i)$ as $$S64(i) = \begin{matrix} S32(i) & S32(i) \\ S32(i) & -S32(i) \end{matrix}$$

Define $S128(i)$ as $$S128(i) = \begin{matrix} S64(i) & S64(i) \\ S64(i) & -S64(i) \end{matrix}$$

Define $S256(i)$ as $$S256(i) = \begin{matrix} S128(i) & S128(i) \\ S128(i) & -S128(i) \end{matrix}$$

At each stage of the above process, the number of common codes in the four codesets is doubled, ending with 8 common codes in the four 5256(i).

If it is desired to transmit higher datarates than length=32 spreading codes imply, the extended simplex sets cannot be simply split down in the middle to produce 16, length 16 codes, however, the length-32 codes may be split in the manner described in simultaneously filed PCT application PCT/SE2005/001130 filed 6 Jul. 2005, entitled "NON-CONTIGUOUS VARIABLE LENGTH ORTHOGONAL CODES", and U.S. Provisional Patent Application 60/585,097 filed Jul. 6, 2004, both incorporated herein by reference in their entirety.

Using the methods described above, improved CDMA system performance may be achieved in either satellite or terrestrial communications applications of CDMA, by devising codesets by the methods or with the properties disclosed and either storing or downloading the codes to a network or mobile station.

Features provided by the technology include:

A mobile phone for use in a CDMA network, the mobile phone comprising a receiver for receiving and decoding a channel assignment message to obtain a bit pattern of a CDMA despreading code to use in decoding subsequent traffic data symbols.

A mobile phone for use in a CDMA network, comprising: a memory for storing a plurality of orthogonal codesets; a receiver for receiving and decoding a channel assignment message; and, a code selector for selecting one or more codes from a selected one of said stored codesets according to said decoded channel assignment. message.

A Code Division Multiple Access communications method comprising: dividing a service area into cells that re-use the same spectral resources; and, selecting a set of orthogonal spreading codes to use in each cell, the codes in one cell being different than the codes in an adjacent cell apart from having at least one code in common. As a further optional feature, the at least one common code can be or is used as a pilot code. As a further optional feature, the at least one code in common comprises at least two codes in common, one of which is or can be used for a pilot code in a first cell and a broadcast control channel in a second cell, and the other common code is or can be used for the pilot channel in the second cell and a broadcast control channel in the first cell.

An improved CDMA system comprising: a network of base station sites, each site serving a number of azimuthal sectors by means of associated directional antennas; a separate transmitter connected to each of said directional antennas for developing signals based on CDMA codes for radiation in the respective sector, the CDMA codes in each sector being mutually orthogonal within a sector and being different for different sectors apart from a number of common codes allocated to be pilot codes or broadcast control channel codes for respective sectors.

An improved satellite communications system using CDMA, comprising: a multi-beam, satellite-borne antenna for illuminating the service area with a plurality of partially overlapping beams; and, a transmit signal generator for producing CDMA signals based on a number of CDMA spreading codes for radiation in said beams, each code being orthogonal to as many other codes as possible that are radiated in the same or adjacent beams and non-orthogonal to other codes radiated to more distant geographical areas. As a further optional feature, the at least one code is radiated to all parts of the service area and is orthogonal to all other radiated codes. As a further optional feature, the at least one code orthogonal to all other radiated codes is a pilot code used by receiving stations to obtain a coherent phase reference for demodulating a traffic code. In such case, as a further optional feature, a digital beamformer directs traffic signals to their intended recipients and ensures that said pilot code has a defined phase relationship with each traffic signal at its intended recipient receiver.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiment, but on the contrary, is intended to cover various modifications and equivalent arrangements.

What is claimed is:

1. A user equipment unit for use in a code division multiple access (CDMA) network, comprising:
   a transceiver configured to perform radio communications with a radio access network;
   a memory configured to store plural orthogonal codesets;
   a code selector configured to select a code from one of the plural codesets for use in performing the radio communications with the radio access network;
   wherein the plural orthogonal codesets have at least a first code in common with one another,
   wherein the plural orthogonal codesets is generated by a process comprising:
   (1) forming a set of simplex codesets, each simplex codeset of the set being configured using a different maximum length sequence,
   (2) extending each simplex codeset of the set to obtain an extended orthogonal codeset,
   (3) using at least some extended orthogonal codesets for inclusion as one of the plural orthogonal codesets, and
   (4) including a Walsh Hadamard codeset as one of the plural orthogonal codesets.

2. The user equipment unit of claim 1, wherein the code selector is configured to select the code for use in performing the radio communications in accordance with a code selection indicator included in a channel assignment message received from the radio access network.

3. The user equipment unit of claim 1, wherein the code selector is configured to select the code for use in performing the radio communications based on an identity of a cell in which the user equipment unit operates.

4. The user equipment unit of claim 1, wherein extending each simplex codeset of the set includes:
   adding an all-zero codeword to each simplex codeset;
   adding a zero column to each simplex codeset.

5. The user equipment unit of claim 1, wherein each codeset of the plural orthogonal codesets is configured to have at least the first code in common with one another by being generated by a process comprising:
   forming initial codesets by determining maximum length sequences of length L−1, and using the sequences to form extended simplex codesets;
   augmenting the initial codesets by including a Walsh-Hadamard codeset in the initial codesets;
   determining a column permutation of L−1 non-zero columns that, when applied repeatedly, form a closed cycle of distinct codesets for the initial codesets;
   optionally including another initial codeset that does not use any of the codes in the closed cycles generated so far, and which is also closed-cycled by the same column permutation;
   aligning cycles of the codesets if necessary to obtain a desirable correlation;
   reordering codes for obtaining minimum correlation between adjacent codes.

6. The user equipment unit of claim 1, further comprising using cross correlation values as a criteria for determining which of the extended orthogonal codesets to include as one of the plural orthogonal codesets.

7. A radio access network comprising:
   a user equipment unit configured to perform code division multiple access (CDMA) radio communications between the user equipment unit and the radio access network;
   a radio access network node comprising:
      a memory configured to store plural orthogonal codesets, the plural orthogonal codesets having at least a first code in common with one another;
      a code selector configured to select a specified code from the plural codesets for use by the user equipment unit in performing the radio communications between the user equipment unit and the radio access network;
      a transmitter configured to transmit the specified code or an indication of the specified code to the user equipment unit,
   wherein the plural orthogonal codesets are generated by a process comprising:
   (1) forming, a set of simplex codesets, each simplex codeset of the set being configured using a different maximum length sequence;
   (2) extending each simplex codeset of the set obtain an extended orthogonal codeset;
   (3) using at least some extended orthogonal codesets for inclusion as one of the plural orthogonal codesets; and
   (4) including a Walsh Hadamard codeset as one of the plural orthogonal codesets.

8. A code division multiple access (CDMA) communications network comprising:
   a service area comprising cells that re-use same spectral resources;
   at least one network node configured to select, from plural orthogonal codesets, a codeset for use in each cell, a codeset in one cell being different than a codeset in an adjacent cell apart from having at least one code in common,
   a memory configured to store plural orthogonal codesets, the plural orthogonal codesets having at least a first code in common with one another,
   a satellite antenna system configured to transmit plural radio beams into respective plural cells in accordance with a codeset reuse pattern, the codesets employed in the reuse pattern belonging to the plural orthogonal codesets,
   wherein the satellite antenna system is further configured to transmit the plural beams such that radiation from the plural beams is phased so that constructive addition occurs at beam edges to produce a substantially uniform pilot signal illumination for the plural cells.

9. The network of claim 8, wherein the first code in common is used as for a common pilot code for the plural radio beams.

10. A radio access network node for a code division multiple access (CDMA) radio access network, the radio access network node comprising:
   a memory configured to store plural orthogonal codesets, the plural orthogonal codesets having at least a first code in common with one another; and
   an satellite antenna system configured to transmit into differing cell sectors using codes selected from the plural orthogonal codesets in accordance with a codeset reuse pattern, the codesets employed in the reuse pattern belonging to the plural orthogonal codesets, wherein the first code in common from the plural orthogonal codesets is a common pilot code for plural radio beams, wherein the satellite antenna system is further configured to transmit the plural beams such that radiation from the plural beams is based so that constructive addition occurs at beam edges to produce a substantially uniform pilot signal illumination for the plural cells, wherein the network is a satellite communications network.

11. The radio access network node of claim 10, wherein the codes utilized within a sector are orthogonal and wherein two codes used in adjacent sectors are selected based on a correlation value.

12. The radio access network node of claim 10, wherein the first code in common is used in plural sectors as a pilot code.

13. The radio access network node of claim 10, wherein at least a common code is used in plural sectors for a calling channel.

14. A computer implemented method of generating plural orthogonal codesets, the method comprising:
(1) forming a set of simplex codesets on a processing system, each simplex codeset of the set being configured using a different maximum length sequence;
(2) extending each simplex codeset of the set to obtain an extended orthogonal codeset;
(3) using at least some extended orthogonal codesets for inclusion as one of the plural orthogonal codesets; and,
(4) including a Walsh Hadamard codeset as one of the plural orthogonal codesets to be used for radio communications in a radio access network.

15. The method of claim 14, wherein extending each simplex codeset of the set comprises:
adding an all-zero codeword to each simplex codeset;
adding a zero column to each simplex codeset.

16. The method of claim 14, further comprising using cross correlation values as a criteria for determining which of the extended orthogonal codesets to include as one of the plural orthogonal codesets.

17. A computer implemented method of generating codesets, the method comprising:
forming initial codesets by determining maximum length sequences of length L-1 on at least one processor, and using the sequences to form extended simplex codesets;
augmenting the initial codesets by including a Walsh-Hadamard codeset in the initial codesets;
determining a column permutation of L-1 non-zero columns that, when applied repeatedly, form a closed cycle of distinct codesets for the initial codesets;
optionally including another initial codeset that does not use any of the codes in the closed cycles generated so far, and which is also closed-cycled by the same column permutation;
aligning cycles of the codesets if necessary to obtain a desirable correlation;
reordering codes for obtaining minimum correlation between adjacent codes wherein the codesets are used in a communication network that includes a satellite antenna system configured to transmit plural radio beams into respective plural cells in accordance with a codeset reuse patter, the generated codesets employed in the reuse pattern belonging to plural orthogonal codesets.

18. A method of operating a radio access network comprising:
selecting, at a node of the radio access network, a specified code from plural codesets for use in performing the radio communications between the radio access network and a user equipment unit, the plural orthogonal codesets having at least a first code in common with one another;
transmitting to the user equipment unit the specified code or an indication of the specified code,
wherein each codeset of the plural orthogonal codesets is configured to have at least the first code in common with one another by being generated by a process comprising:
(1) forming a set of simplex codesets, each simplex codeset of the set being configured using a different maximum length sequence;
(2) extending each simplex codeset of the set to obtain an extended orthogonal codeset;
(3) using at least some extended orthogonal codesets for inclusion as one of the plural orthogonal codesets; and
(4) including a Walsh Hadamard codeset as one of the plural orthogonal codesets.

19. The method of claim 18, wherein extending each simplex codeset of the set includes:
adding an all-zero codeword to each simplex codeset;
adding a zero column to each simplex codeset.

20. The method of claim 18, wherein each codeset of the plural orthogonal codesets is configured to have at least the first code in common with one another by being generated by a process comprising:
forming initial codesets by determining maximum length sequences of length L-1, and using the sequences to form extended simplex codesets;
augmenting the initial codesets by including a Walsh-Hadamard codeset in the initial codesets;
determining a column permutation of L-1 non-zero columns that, when applied repeatedly, form a closed cycle of distinct codesets for the initial codesets;
optionally including another initial codeset that does not use any of the codes in the closed cycles generated so far, and which is also closed-cycled by the same column permutation;
aligning cycles of the codesets if necessary to obtain a desirable correlation;
reordering codes for obtaining minimum correlation between adjacent codes.

21. The method of claim 18, further comprising using cross correlation values as a criteria for determining which of the extended orthogonal codesets to include as one of the plural orthogonal codesets.

22. A method of operating a code division multiple access (CDMA) communications network comprising:
dividing a service area into cells that re-use same spectral resources;
selecting, from plural orthogonal codesets, a codeset for use in each cell, a codeset in one cell being different than a codeset in an adjacent cell apart from having at least one code in common;
transmitting plural radio beams into respective plural cells in accordance with a codeset reuse pattern, the codesets employed in the reuse pattern belonging to the plural orthogonal codesets; and
using the first code in common as for a common pilot code for the plural radio beams;
phasing radiation in the plural beams so that constructive addition occurs at beam edges to produce a substantially uniform pilot signal illumination for the plural cells,
wherein network is a satellite communications network.

23. A method of operating a radio access network node for a code division multiple access (CDMA) radio access network, the method comprising:

storing plural orthogonal codesets in a memory of a network node, the plural orthogonal codesets having at least a first code in common with one another;

transmitting into differing cell sectors using codes selected from the plural orthogonal codesets, wherein the transmitting includes transmitting plural radio beams into the differing cell sectors in accordance with a codeset reuse pattern, the codesets employed in the reuse pattern belonging to the plural orthogonal codesets; and using a first code in common from the plural orthogonal codesets for a common pilot code for the plural radio beams;

phasing radiation in the plural beams so that constructive addition occurs at beam edges to produce a substantially uniform pilot signal illumination for the differing cell sectors, wherein the network is a satellite communications network.

24. The method of claim 23, further comprising using orthogonal codes within a sector and wherein two codes used in adjacent sectors are selected based on a correlation value.

25. The method of claim 23, further comprising using the first code in common in plural sectors as a pilot code.

26. The method of claim 23, further comprising using at least one code in common in plural sectors for a calling channel.

* * * * *

UNITED STATES PATENT AND TRADEMARK OFFICE
CERTIFICATE OF CORRECTION

| | | |
|---|---|---|
| PATENT NO. | : 8,004,959 B2 | Page 1 of 1 |
| APPLICATION NO. | : 11/631789 | |
| DATED | : August 23, 2011 | |
| INVENTOR(S) | : Dent | |

It is certified that error appears in the above-identified patent and that said Letters Patent is hereby corrected as shown below:

On the Title Page, Item (75), under "Inventors", Line 1, delete "Paul" and insert -- Paul W. --, therefor.

In Fig. 5, Sheet 7 of 10, for Tag "112", in Line 1, delete "PSTN/IDSN" and insert -- PSTN/ISDN --, therefor.

In Column 3, Line 5, delete "synchonisation" and insert -- synchronisation --, therefor.

In Column 17, Line 61, delete "URAN" and insert -- UTRAN --, therefor.

In Column 18, Line 55, delete "Alternatively." and insert -- Alternatively, --, therefor.

In Column 30, Line 22, in Claim 7, delete "forming," and insert -- forming --, therefor.

In Column 30, Line 25, in Claim 7, delete "set" and insert -- set to --, therefor.

In Column 30, Line 28, in Claim 7, delete "and" and insert -- and, --, therefor.

In Column 31, Line 6, in Claim 10, delete "based" and insert -- phased --, therefor.

In Column 31, Line 43, in Claim 17, delete "L-1on" and insert -- L-1 on --, therefor.

In Column 31, Line 57, in Claim 17, delete "codes" and insert -- codes; --, therefor.

In Column 31, Line 61, in Claim 17, delete "patter," and insert -- pattern, --, therefor.

Signed and Sealed this
Eighth Day of May, 2012

David J. Kappos
*Director of the United States Patent and Trademark Office*